(12) United States Patent
Schmidt et al.

(10) Patent No.: US 12,487,297 B2
(45) Date of Patent: Dec. 2, 2025

(54) MRI RADIO-FREQUENCY HEATING AMELIORATION FOR METALLIC BRAIDED CATHETERS

(71) Applicant: THE JOHNS HOPKINS UNIVERSITY, Baltimore, MD (US)

(72) Inventors: Ehud J. Schmidt, Towson, MD (US); Ronald D. Watkins, Stanford, CA (US); Henry R. Halperin, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 18/734,836

(22) Filed: Jun. 5, 2024

(65) Prior Publication Data

US 2025/0076424 A1 Mar. 6, 2025

Related U.S. Application Data

(63) Continuation of application No. 16/640,803, filed as application No. PCT/US2018/047157 on Aug. 21, 2018, now abandoned.

(60) Provisional application No. 62/548,020, filed on Aug. 21, 2017.

(51) Int. Cl.
*G01R 33/28* (2006.01)
*A61M 25/00* (2006.01)
*G01R 33/36* (2006.01)

(52) U.S. Cl.
CPC ......... *G01R 33/285* (2013.01); *A61M 25/005* (2013.01); *G01R 33/3685* (2013.01)

(58) Field of Classification Search
CPC ............. G01R 33/285; G01R 33/3685; A61M 25/005; A61B 5/055
See application file for complete search history.

(56) References Cited

U.S. PATENT DOCUMENTS

| | | | |
|---|---|---|---|
| 6,284,971 B1 * | 9/2001 | Atalar | H01P 3/06 174/102 R |
| 6,605,775 B1 * | 8/2003 | Seeber | H05K 9/0066 439/607.41 |
| 11,018,717 B1 * | 5/2021 | Waks | H05K 9/0098 |

(Continued)

OTHER PUBLICATIONS

Seeber, et al., Floating shield current suppression trap. Magn Reson Eng. Apr. 2004;21B(1):26-31.

(Continued)

*Primary Examiner* — Steven L Yeninas

(57) ABSTRACT

An embodiment in accordance with the present invention provides a catheter solution that would maintain MRI-compatible metallic braiding or metallic covering on a surface of the catheter, and that also prevents cables disposed in an interior lumen of the catheter from effectively propagating currents induced from external signal transmissions, which could cause a rise in temperature of the cables themselves and of tissues surrounding the catheter. The present invention uses metals which are non-ferromagnetic and not highly paramagnetic, so they do not cause large susceptibility artifacts in the MRI field. The construction of the braid prevents most of the RF fields from penetrating into the anterior of the catheter. Therefore, there is no need or a reduced need to add heat amelioration components to each electrical cable inside the catheter.

20 Claims, 25 Drawing Sheets

(56) References Cited

U.S. PATENT DOCUMENTS

| | | | | |
|---|---|---|---|---|
| 2002/0040185 | A1* | 4/2002 | Atalar | H01Q 1/362 |
| | | | | 600/423 |
| 2003/0173099 | A1* | 9/2003 | Reykowski | G01R 33/3685 |
| | | | | 174/376 |
| 2003/0209354 | A1* | 11/2003 | Seeber | H05K 9/0066 |
| | | | | 174/383 |
| 2008/0208031 | A1 | 8/2008 | Kurpad et al. | |
| 2010/0280584 | A1* | 11/2010 | Johnson | A61N 1/05 |
| | | | | 607/116 |
| 2012/0182015 | A1* | 7/2012 | Driemel | G01R 33/3685 |
| | | | | 324/322 |
| 2012/0203100 | A1* | 8/2012 | Weiss | A61B 18/1492 |
| | | | | 600/421 |
| 2013/0131496 | A1 | 5/2013 | Jenkins et al. | |
| 2013/0245741 | A1 | 9/2013 | Atalar et al. | |
| 2017/0113036 | A1 | 4/2017 | Bottomley et al. | |
| 2019/0178960 | A1* | 6/2019 | Halperin | G01R 33/287 |
| 2020/0233048 | A1* | 7/2020 | Corea | H03H 3/00 |
| 2020/0348380 | A1* | 11/2020 | Taracila | G01R 33/34007 |
| 2021/0088609 | A1* | 3/2021 | Zemskov | A61B 5/055 |
| 2024/0103107 | A1* | 3/2024 | Yang | G01R 33/3657 |

OTHER PUBLICATIONS

Basar, et al., Segmented nitinol guidewires with stiffness-matched connectors for cardiovascular magnetic resonance catheterization: preserved mechanical performance and freedom from heating. J Cardiovasc Magn Reson. Nov. 30, 2015;17:105.

Griffin, et al., Miniaturizing Floating Traps to Increase RF Safety of Magnetic-Resonance-Guided Percutaneous Procedures. IEEE Trans Biomed Eng. Feb. 2017;64(2):329-340.

\* cited by examiner (A) SIDE VIEW OF
FLOATING RESONANT
BALUN (B) FRONT VIEW OF
FLOATING RESONANT
BALUN

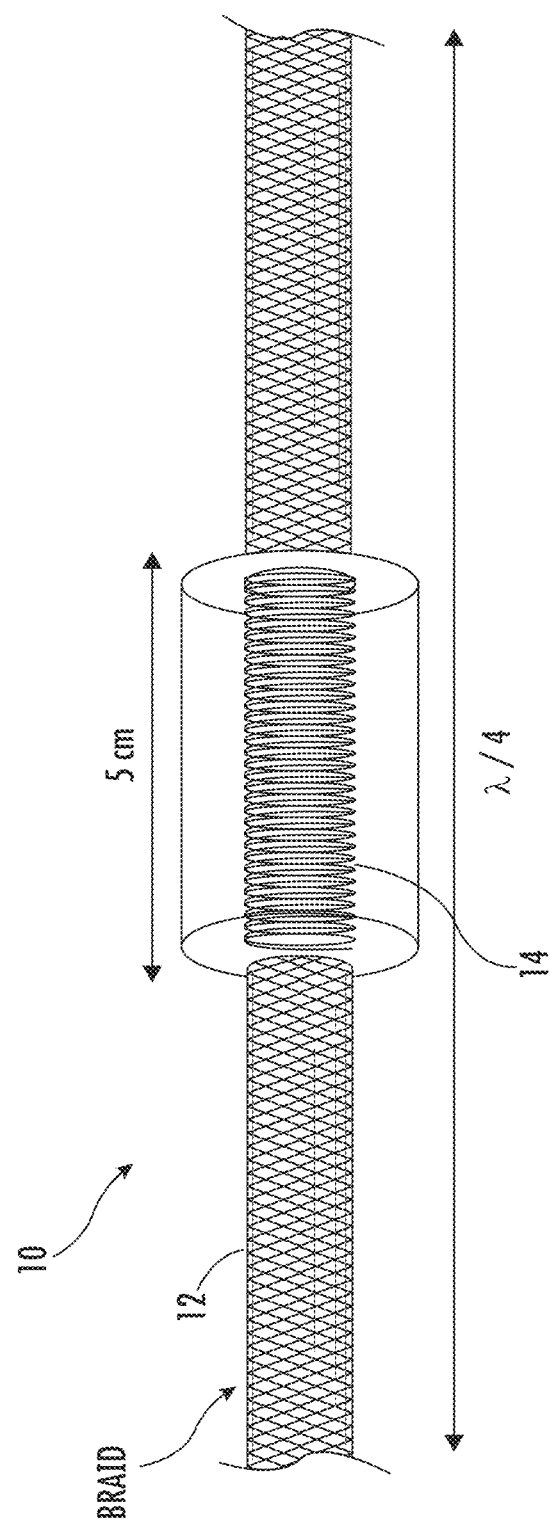

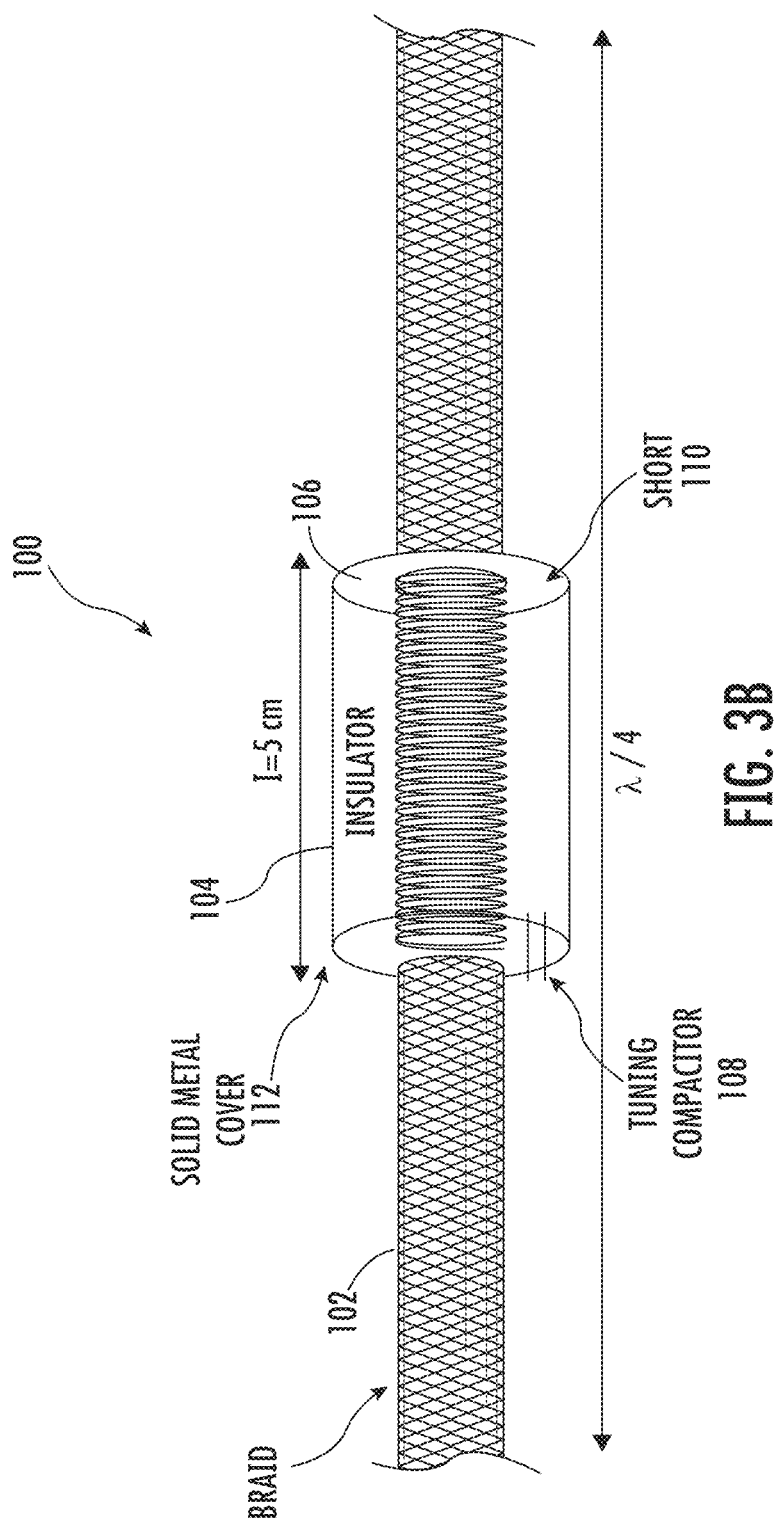

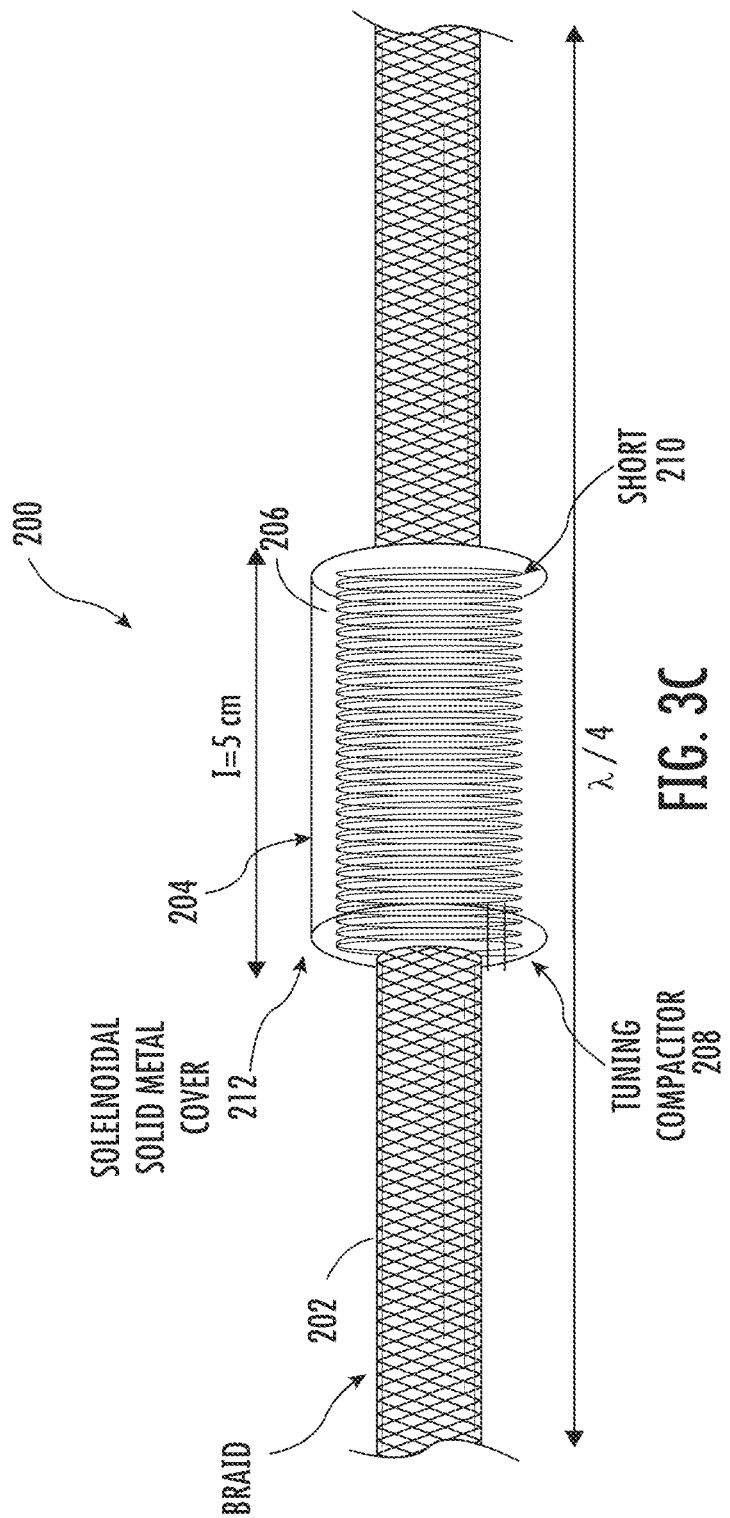

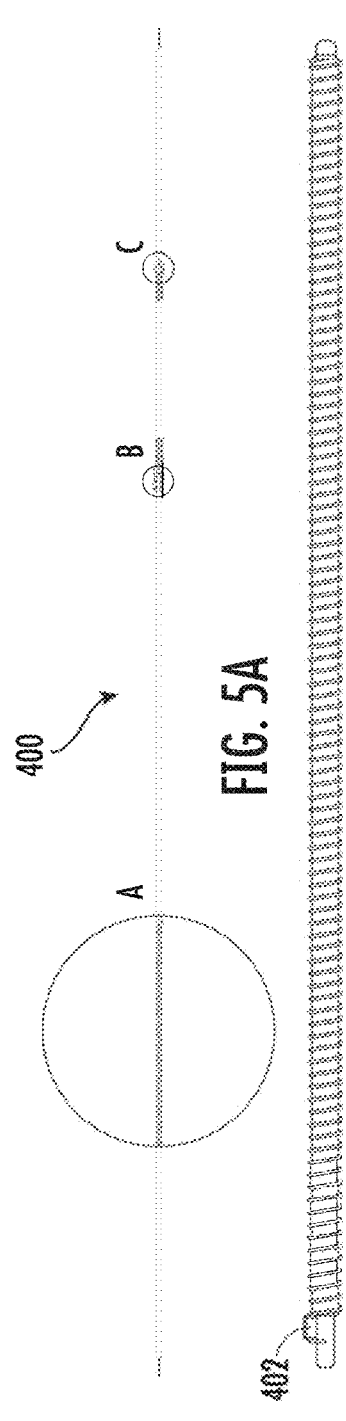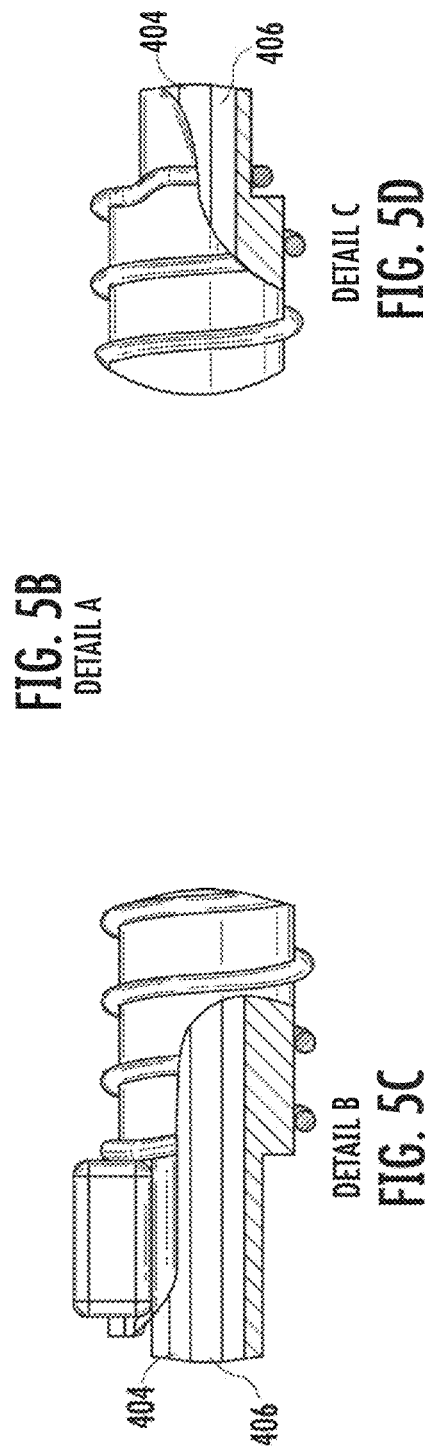
FIG. 5A
FIG. 5B
DETAIL A
FIG. 5C
DETAIL B
FIG. 5D
DETAIL C

TEST ARRANGEMNET OF TWO FLOATING BALUNS ON 30 cm NITINOL TUBE TUNINIG CAPACITOR OR INTERNAL COAX ARE NOT PRESENT IN THIS PICTURE

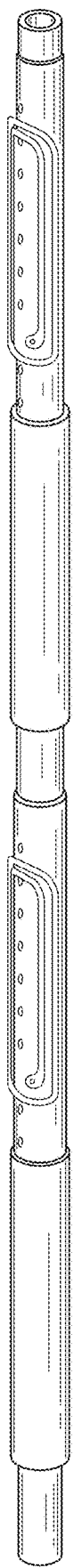
FIG. 7H  TWO MR-TRACKING MICRO-COILS WRAPPED ON A GUIDEWIRE SHAFT

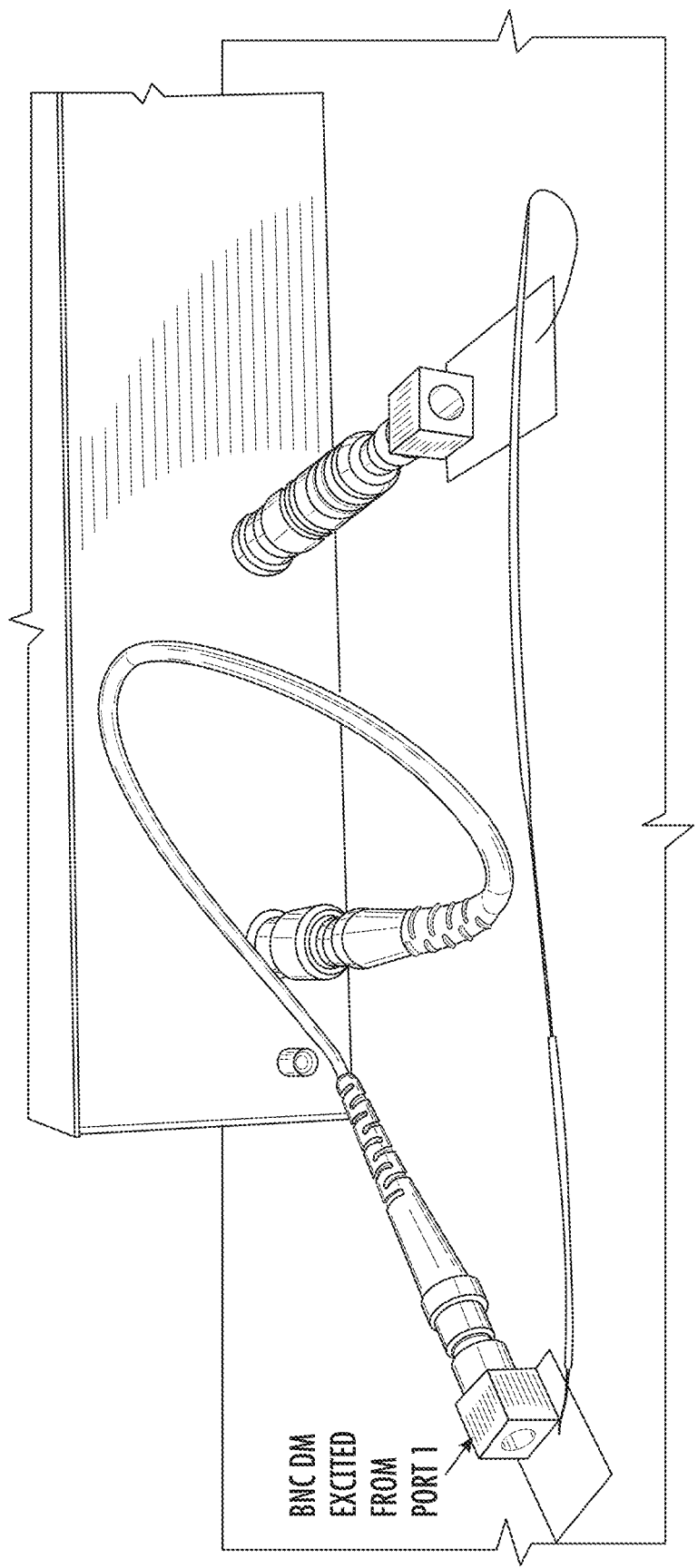

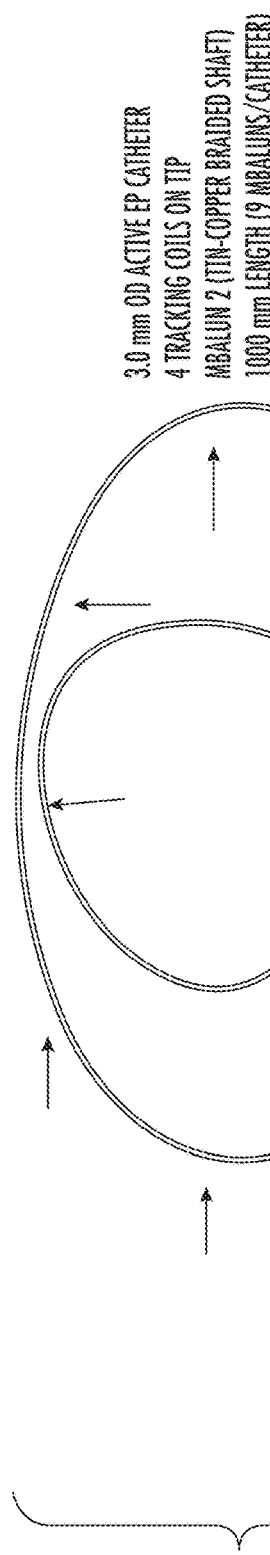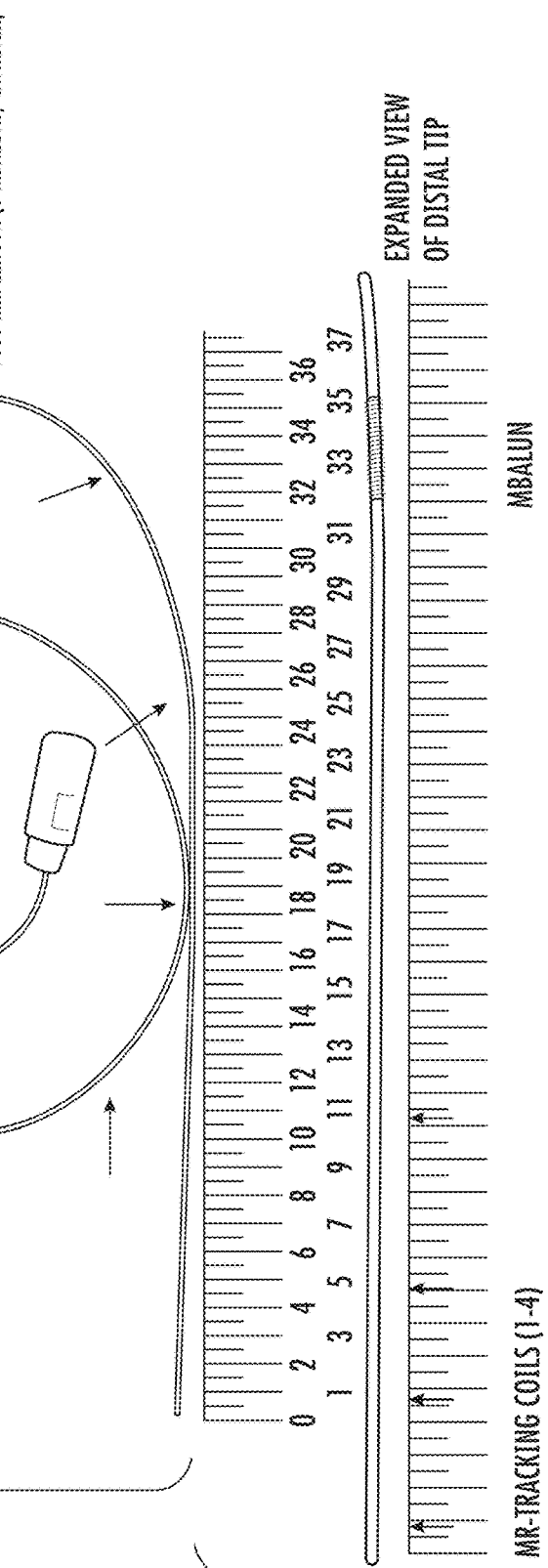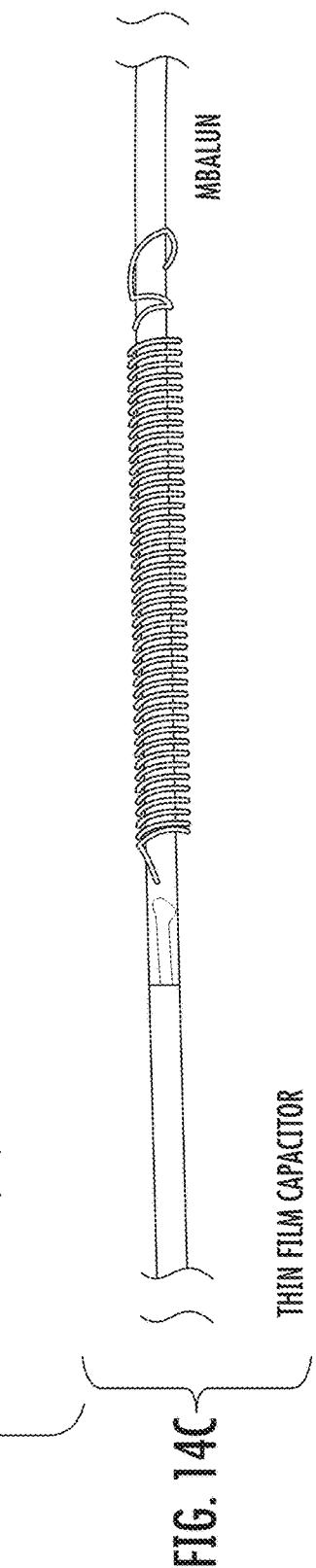
FIG. 14A
FIG. 14B
FIG. 14C

MRI RADIO-FREQUENCY HEATING AMELIORATION FOR METALLIC BRAIDED CATHETERS

CROSS REFERENCE TO RELATED APPLICATION

This application is a continuation of U.S. patent application Ser. No. 16/640,803, filed on Feb. 21, 2020, which is a 35 U.S.C. § 371 U.S. national entry of International Application No. PCT/US2018/047157, having an international filing date of Aug. 21, 2018, which claims the benefit of U.S. Provisional Application No. 62/548,020, filed Aug. 21, 2017, the content of each of the aforementioned applications is herein incorporated by reference in their entirety.

GOVERNMENT RIGHTS

This invention was made with government support under HL094610 awarded by the National Institutes of Health. The government has certain rights in the invention.

FIELD OF THE INVENTION

The present invention relates generally to medical devices. More particularly, the present invention relates to amelioration of MRI radio-frequency induced heating for metallic covered or metallic braided catheters, or other similarly shaped invasive devices, whose shaft is longer than a quarter wavelength in the ambient media at the MRI scanner's Larmor frequency.

BACKGROUND OF THE INVENTION

Metallic braided catheters (e.g. catheters, sheaths) or those made of solid-covered metallic backbones (guidewires, injection catheters, trans-septal needles) are commonly used in vascular intervention, since they provide torsional strength while satisfying the difficult constraint of being very long (>1000 mm) and thin (0.5-3 mm in diameter). Similarly built devices (injection needles, biopsy needles, brachytherapy needles) are also used in other types of medical interventions, surgeries and invasive therapies. The most commonly used braids are made of metals, due to their superior mechanical properties (the Young's and Shear moduli), as well as the large degree of force (stress) for which they retain elastic behavior (the yield stress).

Building invasive devices with these properties that can be safely used in magnetic resonance imaging (MRI) scanners is frequently desired, since soft-tissue contrast in the MRI is superior to that available with other imaging modalities, which allows for detection, treatment and treatment monitoring that may result in better outcomes than that possible if the procedure is performed without MRI guidance. Unfortunately, elongated metallic materials, when they are longer than a quarter of an electromagnetic wavelength, which for the high relative dielectric constant ($\varepsilon\sim60$) encountered in the human body, which shortens the speed of light considerably (by the square root of $\varepsilon$), can be 20-30 cm at the Magnetic Resonance Imaging (MRI) operational (Larmor) frequencies (63.8 MHz, 123 MHz or higher). Even when the devices are constructed of nonmagnetic (non-ferrous) materials, they or their surroundings can increase in temperature (heat up) within the Radiofrequency (RF) field of the MRI scanner. This is mainly due to induction of RF from the body transmit coil of the MRI scanner, which occurs when RF pulses are delivered during the course of an MRI pulse sequence, which induces RF current flow at the exciting frequency along the surfaces of these thin structures. Much of the RF-induced current, when the cable is formed of two conducting wires, such as coaxial or twisted-pair cables, and the if the cable diameter is far smaller than a quarter-wavelength at the exciting RF frequency, is referred to as common mode propagation, in which the direction of the current flowing on both wires is in a single spatial direction. Common-mode propagation differs from most of the information-providing signal on those cables, which is referred to as differential-mode propagation, in which current flow is in opposing directions in the two wires. Additionally, when the cable is composed of a single wire (referred to as single-ended transmission), the induced current can also severely influence the signal in the wire, since the induced signal is generally of a different character (frequency spectrum, time-domain shape, timing, etc.) than the signal which is carried by the wire in the absence of the signal induction (e.g. the desired signal). The resulting cumulative signal is hard to read (or interpret).

In order to avoid the induced currents and deliver the required performance, the current braiding solutions used in MRI-compatible elongated catheters are: 1. Braids made of non-metallic materials (such as Kevlar, and polymers) are used, although most of these non-metallic braiding materials have inferior mechanical properties, so that the devices require larger footprints (larger diameters) to obtain equivalent performance, or may be more brittle; and 2. Construct catheters without incorporating any braids, which delivers catheters that are more difficult to navigate within the vascular system.3. Physically bisect (cut) the catheter's braid at increments of the order of a quarter of a wavelength, which results in a high impedance electrical connection between these segments of the catheter, which complicates the construct of the catheter and may weaken its mechanical strength.

In addition, it is uncommon to find catheters made of metallic backbone materials (e.g. metallic guidewires, trans-septal needles, etc.) in use in MRI scanners. In the rare cases where these are used, there are severe restrictions on use; they must be used only together specific low-energy MRI sequences, and thereafter removed from the body.

An additional problem is posed by cables that run within the anterior of the MRI-compatible catheters (inside the metallic backbone or metallic braid), such as those that transport electrical information from a variety of sensors (such as MRI imaging and tracking coils, ultrasonic crystals, electrocardiogram electrodes, temperature, force and pressure sensors) found at multiple locations along the shaft of the catheter. Because the non-metallic covered or non-metallic braided catheters do not have metal on their outside surface, the electrical and magnetic fields induced by the MRI scanner's body coil can penetrate into the inside of the catheter without being substantially attenuated, and can then capacitively or inductively induce current flow on the cables inside. The electric fields generated by such current flow can increase the temperature of the cables or the surrounding of these cables (e.g. heat these structures). This effect increases in severity when the length of the catheter is greater than a quarter-wavelength (60 or 30 cm) at an MRI scanner's Larmor frequency (63.8 MHz for 1.5 Tesla, 123.2 or 127 MHz at 3T), since then standing electromagnetic waves are supported on the cables, which greatly increases the energy stored in the wires, which can then be dissipated as heat both within sections of the cables themselves, as well as in the media (blood, soft-tissue) immediately surrounding the catheter. When the temperature rise is sufficient to risk damaging tissues outside the body, or hurting a person that touches the catheter, severe restrictions on use of the catheter in the MRI environment result, such as requiring it to be used with MRI sequences that transmit very low levels of RF, which are referred to as Low Specific Absorption Rate (SAR) sequences.

To resolve these heating risks, it is commonly necessary to apply heat mitigation techniques individually to each cable that runs inside the catheter. There are several methods to perform heat mitigation, such as by addition of transformers along the cables, but these take up valuable space within the constricted diameter of the catheter (typically <3 mm), which restricts the number of cables that can be used (and therefore the numbers of monitored sensors). The heat mitigation methods can also potentially reduce the signal fidelity of the signals traveling up the cables, which occurs if transmission losses or signal distortion are associated with the mitigation methods.

Therefore, it would be advantageous to provide an MRI radio-frequency heating amelioration method for metallic backbone or metallic braided catheters, and to do so without requiring excessive space in the catheter.

SUMMARY OF THE INVENTION

The foregoing needs are met, to a great extent, by the present invention, wherein in one aspect a catheter compatible with magnetic resonance imaging (MRI) includes a metallic braided, or solid metal covered, catheter. The catheter also includes one or more miniature resonant radiofrequency floating traps (MBaluns).

In accordance with an aspect of the present invention, each metallic braided, or solid metallic covered, segment of the catheter, along with the overlaying, braid-embedded, MBalun have a pattern length of one eighth, one quarter or more of an electromagnetic wavelength. Each catheter segment further includes a single or more segments, of metallic braided or metallic solid-covered catheter being alternated, or overlaid, with a segment of resonant RF trap. The catheter further includes the MBalun being placed around an outside surface of the metallic braided catheter at predetermined intervals. The MBalun further includes an insulator between the metallic braid or solid metal cover and a concentric solenoidal coil, a tuning capacitor at one end, a short at the other end, and an outer cover. In some embodiments the conductivity of the metallic braided or metallic covered catheter is changed (increased or decreased) periodically in order to create an additional impedance to current propagation on the surface of the metal. to a copper shield disposed within an inner lumen of the metallic braided catheter. The RF trap can take the form of a large pitch ("leaky") solenoid. The RF trap is formed from copper or another conductive non-ferromagnetic material. The length of the RF trap, in one embodiment, is 5 cm.

In accordance with another aspect of the present invention, the MBalun further includes an electrically conducting tube or braided cable, which forms an inner conductor of the MBalun. The MBalun includes an insulating dielectric layer configured to overlay the inner conductor of the MBalun. A large (>1) pitch "leaky" solenoid includes multiple conductive wire windings and is configured to overlay the dielectric layer. The solenoid forms the outer conductor of the MBalun. The solenoid is shorted to the inner conductor of the MBalun at one end of the solenoid and is connected to one side of a capacitor at the other end of the solenoid. The capacitor is then connected at its second end to the inner conductor, and the capacitor is used to resonate the MBalun to a desired resonance frequency.

In accordance with yet another aspect of the present invention, the MBalun is configured to remove electromagnetic currents that have been induced on metallic braided or metallic covered catheters from Radio-Frequency (RF) transmitters within the MRI scanner. The MBalun can also be configured to remove electromagnetic currents that have been induced on wires that are within the metallic braided or metallic covered catheters such single wires, coaxial cables, and twisted pair cables from RF transmitters within the MRI scanner.

In accordance with another aspect of the present invention, a device compatible with magnetic resonance imaging (MRI) includes a conductive guidewire. The device also includes an MBalun trap. The MBalun trap is disposed along a length along the guidewire.

In accordance with yet another aspect of the present invention, the guidewire and the RF trap have a pattern length of one quarter of a wavelength. A segment of guidewire is alternated with a segment of MBalun. The resonant RF trap being placed around an outside surface of the guidewire at predetermined intervals. The MBalun further includes a metal layer surrounding the guidewire, a dielectric layer, a coil wrapping surrounding the dielectric layer, a capacitor, and a short. The conductivity of the guidewire can be altered in specific regions in order to create changes in surface conductivity, which create reflections in surface electrical currents. A metallic layer is disposed over a portion of the guidewire.

In accordance with still another aspect of the present invention, the MBalun is configured to remove electromagnetic currents that have been induced on metallic braided or metallic covered catheters from Radio-Frequency transmitters within the MRI scanner. The MBalun can also be configured to remove electromagnetic currents that have been induced on wires that are within the metallic braided or metallic covered catheters such single wires, coaxial cables, and twisted pair cables from Radio-Frequency transmitters within the MRI scanner.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and:

FIG. 3A illustrates a side view of a metallic braided catheter with MRI radio-frequency heating amelioration, according to an embodiment of the present invention.

FIG. 3B illustrates a side view of a metallic braided catheter with MRI radio-frequency heating amelioration, according to an embodiment of the present invention.

FIG. 3C illustrates a side view of a metallic braided catheter with MRI radio-frequency heating amelioration, according to an embodiment of the present invention.

FIGS. 5A-5E illustrate side and partially sectional views of an MBalun device for placement on a metallic covered guidewire, according to an embodiment of the present invention.

FIGS. 7E and 7F illustrate an expanded view of the distal portion of the active metallic guidewire, as well as an expanded view of MBalun2.

FIG. 7H illustrates two MR-Tracking micro-coils wrapped on a guidewire shaft, as employed on the distal end of the active MR-Tracked metallic guidewire that utilizes MBalun technology.

FIG. 8 illustrates an exemplary setup of the laboratory test device which employs a two-port vector network analyzer to test the transmission of differential mode in a coaxial cable that runs through a metallic guidewire section of 20 cm length which is mounted with 2 MBaluns.

FIGS. 14A-14C illustrate views of an active EP catheter constructed with 8 MBaluns of the specific embodiment MBalun2.

DETAILED DESCRIPTION

Figure 1A:
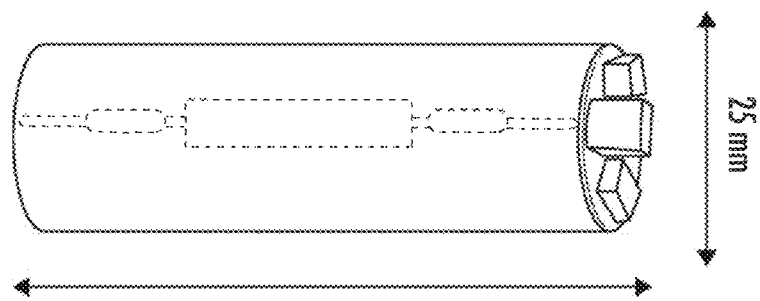
FIGS. 1A and 1B illustrate a side and front view, respectively, of a floating resonant Balun (prior art) used for radio-frequency common-mode reduction and heating amelioration in MRI receiver coils cables.

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

An embodiment in accordance with the present invention provides a catheter solution that would maintain metallic braiding or a solid metallic cover (e.g. a thin continuous tubular metallic cover) on the catheter surface constructed of a material that is MRI-compatible, and that would also prevent cables disposed in an interior lumen of the catheter from carrying large currents that cause the wire itself or its surrounding to greatly increase in temperature ("heat up"), which could present a risk of damage to persons touching the surface of the device or to tissues surrounding the device. The metallic braiding or metallic cover can be referred to as a part of the MBalun. The present invention uses metals which are non-ferromagnetic and also not highly paramagnetic, so they do not cause large susceptibility artifacts in the MRI field. The construction of the braid should also prevent most of the RF fields from penetrating into the anterior of the catheter, so that there would be no need or a reduced need to add heat amelioration components to each electrical cable inside the catheter. The embodiments of the present invention are based on turning the metallic cover or braid itself into a Miniature RF resonant floating Balun", or an MBalun, that dissipates magnetic fields at the MRI scanner's Larmor frequency (63.6/63.8 MHz for 1.5 Tesla or 123.2/127.7 MHz for 3 Tesla, etc.).

The embodiments of the present invention are based on turning the metallic braid itself into an "RF Balun", or a resonant floating RF trap, that dissipates magnetic fields at the MRI scanner's larmor frequency (63.8 MHz for 1.5 Tesla or 123/127 MHz for 3 Tesla, etc.). The new RF Balun, referred to as an MBalun (Minuature floating resonant Balun) has far larger inductance than the conventional Balun. This is achieved by employing a large-pitch ("leaky") solenoid as the external conductor, in place of the traditional tube, since a solenoid has a larger inductance, and use of a large (>>1) pitch in order to couple effectively with magnetic fields oriented in directions orthogonal to the shaft of the device (transverse fields). Three devices, a metallic guidewire, a metallic-braided MR-Tracked electrophysiology catheter and a metallically braided deflectable MR- and impedance tracked, are demonstrated as differing implementations of the invention.

Electromagnetic transmission lines carry signals from various sensors at locations on the catheters to the proximal end of the catheters. When single or coaxial (e.g. shielded) cables run along the shaft, additional fields can be induced onto them from external sources of EM fields (other EM transmitters, additional catheters that couple inductively or capacitively with them, etc.) In many cases, these induced fields are referred to as common mode fields, since they induce currents in the same direction in both of the conductors found in the coaxial cables. It is desirable to remove these induced currents since they can be equivalent or larger than the signal from the sensor, and thereby reduce the fidelity of the transmitted signals, making it harder to interpret the received signals, and in addition, these larger electrical fields can raise the temperature in or around the cables, sometimes reaching levels that can modify the properties of tissues that are in contact with (or close to) the wire.

Radio frequency traps (Baluns) are radio-frequency signal transmission devices that are used to remove such external signal induction by utilizing the ability of magnetic fields to selectively couple to these currents, as they propagate along the shaft of the cables, and attenuate them. Currents that propagate along the shaft of a wire generate magnetic fields that are oriented orthogonally to the shaft direction (in the radial and azimuthal directions, in a cylindrical coordinate system), so the Balun is constructed to be sensitive to these directions of magnetic fields. When coaxial or twisted-pair cables are used, Baluns remove only the common-mode signals, and do not significantly affect the (differential) signal on the cable which exists in the absence of the induced current (e.g. the desired signal). A simple example of a Balun is a coaxial cable that is wound multiple times on a mandrel, which creates a large inductive impedance only for common-mode signals, and thereby creates both a reflection and absorption of the common-mode signal, while allowing the differential mode signal to pass without attenuation. Such Baluns are broadband devices, and therefore have an effect on signal of all frequencies.

Resonant Baluns are used when the discrete frequency (or discrete frequencies) of the interference is known, so the devices can be resonated, making them highly effective at this particular frequency (or frequencies) and not effective for signals at other frequencies.

Resonant Baluns are created by adding a capacitor to the Balun that resonates with the inductance of the Balun at the required frequency (or frequencies). Resonant Baluns are also very useful when non-coaxial (such as single-wired) cables are employed, since this is a situation where a non-resonant Balun would also reduce the fidelity of (e.g. attenuate) the desired signals. With a resonant Balun, if the desired signals have a frequency spectrum which differs from that the resonant Balun is tuned to remove, the desired signals are unaffected by the resonant Balun.

Floating Resonant Baluns are a form of a Resonant Balun in which there is no direct electrical contact between the Balun and the cable(s) from which the energy is to be removed. In floating resonant Baluns, the energy removal is performed using magnetic mutual induction, which is pickup of the magnetic-field created by current flowing in the cable by a $2^{nd}$ structure, and its subsequent dissipation in this structure.

Baluns, resonant Baluns, and floating resonant Balun devices are effective in removing a specific amount of energy from the cable(s). As a result, if the energy induced into the cable at a specific location exceeds the amount of energy that can be removed by a single device, or energy can be induced into the catheter at multiple locations along the shaft, which occurs when a significant length of the catheter is inside the body, additional devices must be added at specific increments along the shaft of the catheter in order to remove enough energy for safe use of the catheter. A common employment practice for resonant or floating resonant Baluns is to place them at the ends of the catheter as well as at periodic increments of a quarter or eighth of a wavelength along the shaft.

Development of a device similar to the floating resonant Baluns for use in catheters would be advantageous, since a single device can be used to remove induced current from several cables, so less space is required, and the cables do not need to be physically contacted or modified, which improves the ease of manufacture.

Existing floating resonant Baluns are primarily constructed from concentric tubes. The inductance of the floating resonant Balun is governed by the outer diameter of the device, the ratio of the inner tube diameter to that of the outer tube diameter, as well as the total length of the device. An exemplary size for Resonant floating Baluns that are placed on commercial MRI cables are 25 mm in diameter, and 84 mm in length, and provide 15-20 dB of attenuation each.

If the resonant floating Balun design is to be miniaturized, so it can be utilized in catheters, the inductance that is generated, assuming the length of the device is unchanged, is very small, so that each resonant floating Balun on the shaft will only remove a small amount (2-3 dB) of the induced current. As a result, resonant floating Baluns are not currently used to remove induced currents in MRI-compatible catheters. An additional problem with the concentric tube construct is that this is a fairly rigid construct, which tends to restrict the mechanical flexibility of a catheter.

The current invention details a new form of the resonant floating Balun, which will be referred to as an MBalun (Minuature floating resonant Balun). The MBalun has far larger inductance than the conventional resonant floating Balun, since it employs a leaky, large pitch, solenoid as the external conductor of the Balun, while maintaining the inner conductor of the resonant floating Balun, which is now formed from the metallic-tube or metallic-braid found in the metallic-backbone or metallic-braided catheter, respectively. The solenoidal coil structure is selected since it has multiple (N>>1) windings, whereas the conventional resonant Balun only has one (N=1), so that the MBalun inductance has larger inductance (of the order of $N^2$), if the device diameters and lengths are equal in both devices. Pitch is the ratio of the distance between successive coil windings in a solenoid to the diameter of the wire used in the solenoid. A tight solenoid commonly has pitch ~1, which generates a uniform magnetic field that is oriented along the shaft of the solenoid. The leaky (pitch>>1) solenoid is chosen for MBalun construct since it couples efficiently with magnetic fields oriented orthogonally to the device shaft (e.g. transverse magnetic fields). Another reason for using a leaky solenoid is that at the range of RF frequencies used in high-field commercial MRI scanners (63-130 MHz), the capacitance created between the close adjacent windings of a tightly wound solenoid restricts the total number of windings that can be used in practice. This is because a tightly wound solenoid that exceeds this total number of windings incurs a self-resonance, where the inductance of the Balun resonates with the (parallel) self-capacitance of the Balun wires, which will occur at a frequency that is lower that the desired operational frequency. As a result, a solenoid that has a larger total number of tightly wound windings would not function as an inductor at the (desired) Larmor frequency, so it cannot be used for MBalun construct. Using large-pitch (typically pitch=3-5) solenoids, since the distance between successive windings is large, MBaluns designs that have 150 windings or more can still be used at 63.8 or 123 MHz. Such a large number of windings is required when MBaluns are constructed for very small (e.g. diameter <1 mm) footprint interventional devices, such as guidewires, where the inductance contribution of each winding in the MBalun is limited by (a) the small outer diameter of the device and (b) a desire to minimize the ratio between the inner diameter of the MBalun (i.e. the outer diameter of the inner tube) and the outer diameter of the solenoid.

It should be realized by those familiar in the art that other RF coil geometries and shapes which can generate large transverse magnetic fields may also be used for constructing MBaluns. It should be realized by those familiar in the art that an MBalun can also be created by replacing the single capacitor in series with a number of capacitors in series, which can have advantages in maintaining RF phase coherence for inductors which have a large number of windings.

Similarly to the placement of multiple resonant floating Baluns on the shaft of a cable, which is required in order to remove a sufficient amount of common-mode current from the wires inside the cable so that it meets MRI thermal safety requirements, it may be desired to place MBaluns at periodically spaced locations along a catheter. These locations generally include both ends of the catheter, as well as locations at increments of a quarter wavelength along the shaft. In addition, if there are locations on the catheter shaft where more common-mode current is generated, such as if there are sensors at a specific location, it may be advisable to place additional MBaluns close to those locations. The guiding principle is bringing the catheter heating performance to the level approved by NEMA/FDA/IEC standards for use of interventional devices in humans within an MRI scanner, namely an increase in temperature of less than 1.5 degrees Celsius for a 4.0 Watt/Kg Specific Absorption Rate sequence. Compliance with the regulation is generally tested in a standard NEMA gel phantom.

When large diameter metallic or metallic braided interventional devices, such as those with diameters >5 mm, are constructed, there may be additional design issues. (a) Large diameter devices receive large amounts of induced current from the MR scanner's body coil. As a result, an efficient MBalun may receive a large amount of RF energy (and current) from the metallic braid or metallic covered tube to which it is attached, and may increase in temperature themselves, as this energy flows and is progressively dissipated inside the MBalun. To resolve this issue, it may be preferable to use multiple MBaluns, that are each less efficient, in place of a single efficient MBalun, so that each of these capture a smaller amount of energy, and thus can dissipate the field without heating. MBalun efficiency can be reduced by lowering the MBalun inductance, which can be achieved by reducing the number of windings, or by reducing the dielectric layer thickness, or by employing a lossy dielectric material. (b) The MBalun solenoidal windings in a large diameter configuration may receive induced voltage directly from the MRI scanner's body coil, since they are located on the external surface of the device. In this case, it may be preferable to enclose the MBalun solenoidal windings within a conductive "pocket" of metallic braid or solid metal, so that the windings are surrounded by metal and are thus not exposed directly to RF induction from the MRI scanner's body coil.

Figure 1B:
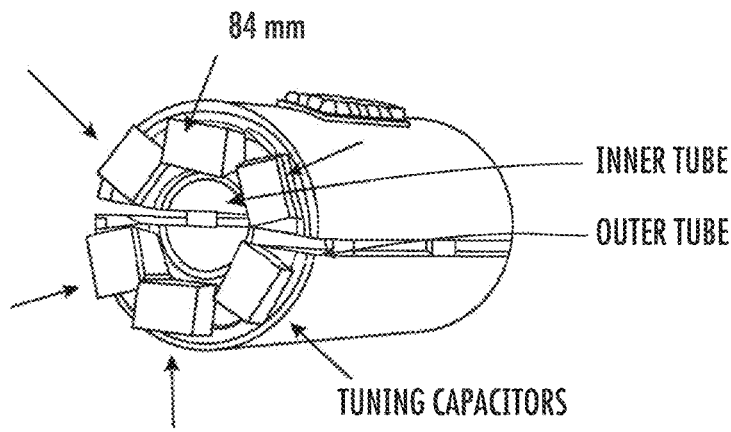

FIGS. 1A and 1B show side and front views, respectively, of an exemplary resonant floating Balun (prior art). The device is shown for purposes of explaining the functionality of the device, which forms the basis for the development of the MBalun. The Resonant Floating Balun (Prior Art) is shown here in a side view (A) and in a front view (B). The side view image shows typical dimensions of such a Balun (outer diameter 25 mm and length 84 mm) which is used on commercial MRI scanners' receiver-coil cables. The Balun is made of two concentric tubes (an Inner and an Outer Tube, red arrows), separated by a dielectric material. Inside the inner tube is an open cylindrical lumen, through which cables and wires can be inserted. (These are the cables and wires from which induced currents are to be removed). At one end of the Balun the Inner and Outer tubes are electrically shorted, while at the other end (shown in B) the Balun is resonated at a predetermined frequency using added capacitors (Green arrows).

Figure 2A:
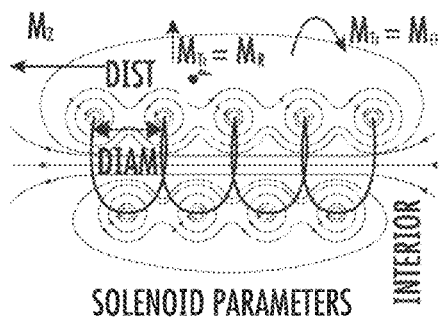
FIGS. 2A, 2B and 2C illustrate schematic diagrams explain the guiding geometric parameters of a solenoidal coil (prior art), and show how differences in the solenoid coil pitch result in different magnetic field distributions, which are highly relevant to MBalun construct.
Figure 2B:
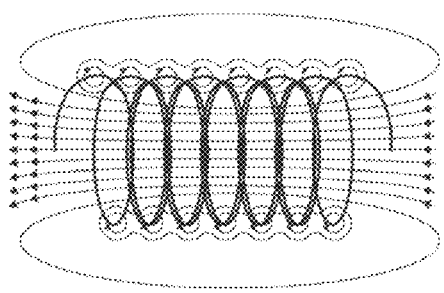
Figure 2C:
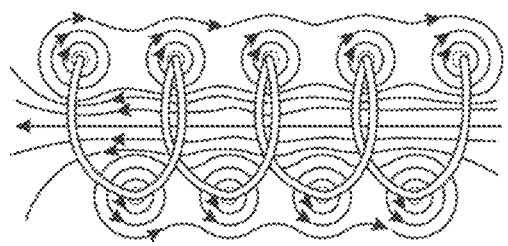

FIGS. 2A, 2B and 2C show exemplary solenoid coils. FIG. 2A defines the critical geometric parameters of the solenoid, such as the pitch, and shows the three magnetic field directions (axial, radial, azimuthal) that are created by current flowing in the solenoid windings. The parameters of a solenoid that are important in MBalun construction. (1) The pitch of the solenoid is the ratio of the distance (Dist.) between windings and the wire diameter (Diam.) (2) Magnetic fields (Blue lines) produced when you flow a current in the solenoid windings. Defined in a cylindrical coordinate frame, $M_z$ is the magnetic field along the solenoid axis. $M_{Tr}$ is the transverse (orthogonal to the axis) field, which includes both the radial ($M_R$) and azimuthal ($M_O$) components, whose directions are indicated by the arrows.

FIG. 2B shows a tightly wound solenoid with a wire running down its center. A tightly wound solenoid is a solenoid that is wound so that it has a small pitch (pitch~1), where pitch is defined as the ratio between the adjacent winding distance to the wire diameter. In a tightly wound solenoid the strongest magnetic field component is the field along the solenoid axis, otherwise referred to as the axial magnetic field. The tightly wound solenoid pitch is small (~1). Most of the magnetic field (grey) is along the solenoid axis ($M_z$), where z is the shaft axis, and there is almost no field transverse ($M_{Tr}$) to the axis (i.e. there is very little $M_R$ or $M_O$, except the small loops which are observed very close to the windings themselves). If a straight wire, black arrow, that carries a current is placed inside the center of this solenoid, it will produce mainly an MT, which will not couple well to this tightly wound solenoid. FIG. 2C shows a loosely wound (leaky) solenoid with a wire running down its center. A leaky solenoid is a solenoid wound so that it has a large pitch (pitch>1), in which there are also strong magnetic fields orthogonal to the axial field, i.e. in the radial and azimuthal directions. These two transverse fields are required in order for the solenoid to effectively couple energy out of the wire running in the center of the solenoid, since current flowing on the wire in the center of the solenoid will only generate transverse magnetic fields.

FIG. 3A illustrates a side view of a metallic braided catheter with MRI radio-frequency heating amelioration, according to an embodiment of the present invention. As illustrated in FIG. 3A, the catheter 10 includes segments of metallic braided catheter 12 interspersed with segments of a solenoid 14. The pattern is repeated every quarter to every eighth of a wavelength. In the embodiment illustrated in FIG. 3A, the pattern is repeated every quarter wavelength, with a solenoid section of approximately 5 cm disposed between segments of braided, or metal-covered, catheter. The length of the segments, and the number of windings they enclose, is chosen to both prevent weakening of the braid and to address issues of the electromagnetic excitation pattern, such as the uniformity and direction of the magnetic field created inside and outside the structure, as well as the self-resonance of the coil at RF frequencies. The segments of metallic braided catheter 12 can take any form known to or conceivable by one of skill in the art. The segments of solenoid 14 can take the form of multiple loops of copper wire, or any other suitable form known to or conceivable to one of skill in the art. The segments of solenoid provide a higher RF impedance along its length as a result of a higher inductance.

FIG. 3B illustrates a side view of a metallic braided catheter with MRI radio-frequency heating amelioration, according to an embodiment of the present invention. As illustrated in FIG. 3B the catheter 100 includes segments of metallic braided catheter 102 interspersed with segments of a resonant RF trap 104. The pattern is repeated every quarter to every eighth of a wavelength. In the embodiment illustrated in FIG. 3B, the pattern is repeated every quarter wavelength, with a resonant RF trap 104 of approximately 5 cm disposed between segments of braided catheter 102. The resonant RF trap 104 breaks the electrical continuity of the metallic braided catheter 102, by placing a segment of higher impedance along the path. The resonant RF trap includes an insulator 106, a tuning capacitor 108, a short 110, and a solid metal cover 112.

FIG. 3C illustrates side views of a metallic braided catheter with MRI radio-frequency heating amelioration, according to an embodiment of the present invention. As illustrated in FIG. 3C the catheter 200 includes a metallic braided catheter 202 and MBalun 204. The MBaluns 204 are placed along the length of the metallic braided catheter 202 with the metallic braided catheter 202 running through an interior lumen of the MBalun 204. Therefore the continuity of the braid is not broken. The resonant RF trap includes an insulator 206, a tuning capacitor 208, a short 210, and a solid metal cover 212. The pattern is repeated every quarter to every eighth of a wavelength. In the embodiment illustrated in FIG. 3C, the pattern is repeated every quarter wavelength, with MBalun 204 of approximately 5 cm disposed around segments of braided catheter 202. Additionally, the inductance of the MBalun per unit length is approximately $L=(N_2^2-1)[(\mu*1)/2\pi]*\ln(b/a)$, where $N_2$ is the numbers of turns on the outer solenoid, b is the diameter of the solenoid and a is the outer diameter of the braid; $\mu=1.257\times10^{-6}$ H/m. Because this solution does not require cutting the braid at all, it is preferred over the solutions detailed in 3A and 3B. This is in part because cutting the braid in turn reduces the mechanical properties of the braid.

Figure 4:
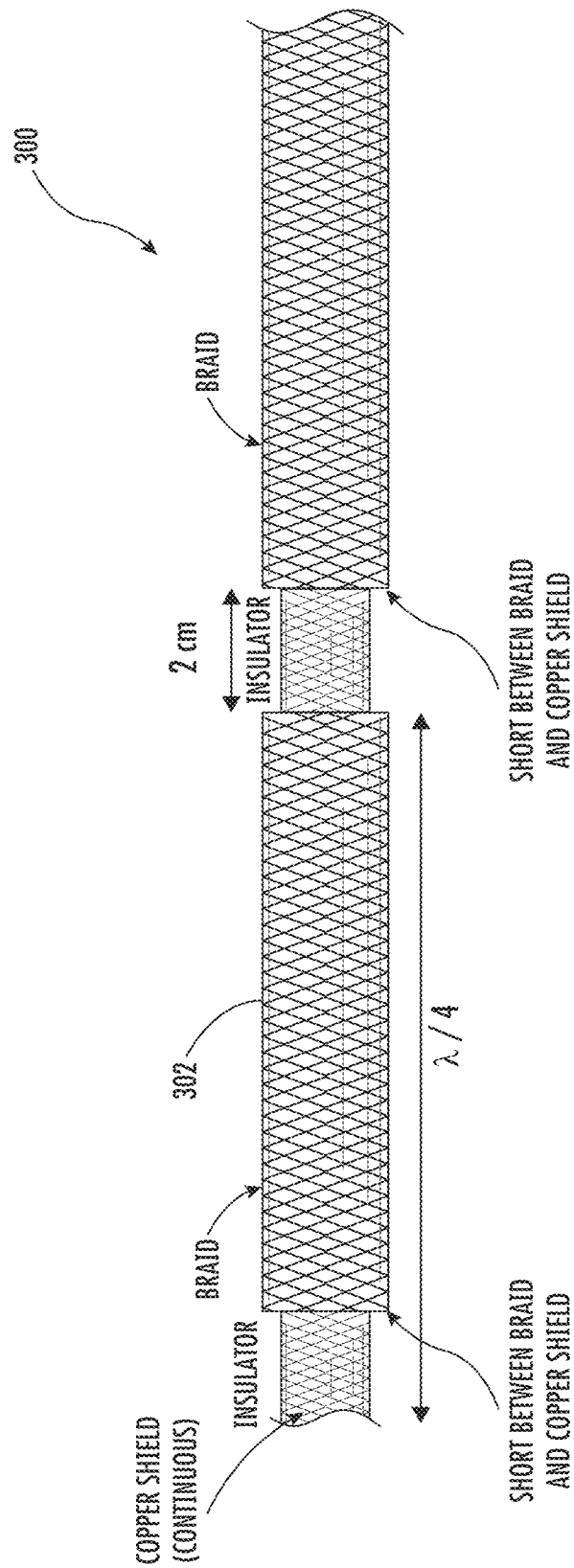
FIG. 4 illustrates a side view of a metallic braided catheter with MRI radio-frequency heating amelioration, according to an embodiment of the present invention.

FIG. 4 illustrates a side view of a metallic braided catheter with MRI radio-frequency heating amelioration, according to an embodiment of the present invention. In the embodiment of FIG. 4 the catheter 300 is formed from a metallic braided catheter 302. The conduction on the metallic braided catheter 302 is broken every quarter wavelength. The conduction is broken on the metallic braided catheter by making a short to an inner shield formed from a soft metal. Preferably, the inner shield is formed from copper. The copper shield can extend continuously throughout the lumen of the metallic braided catheter 302 or can be placed only where there shorts occur.

Figure 5E:
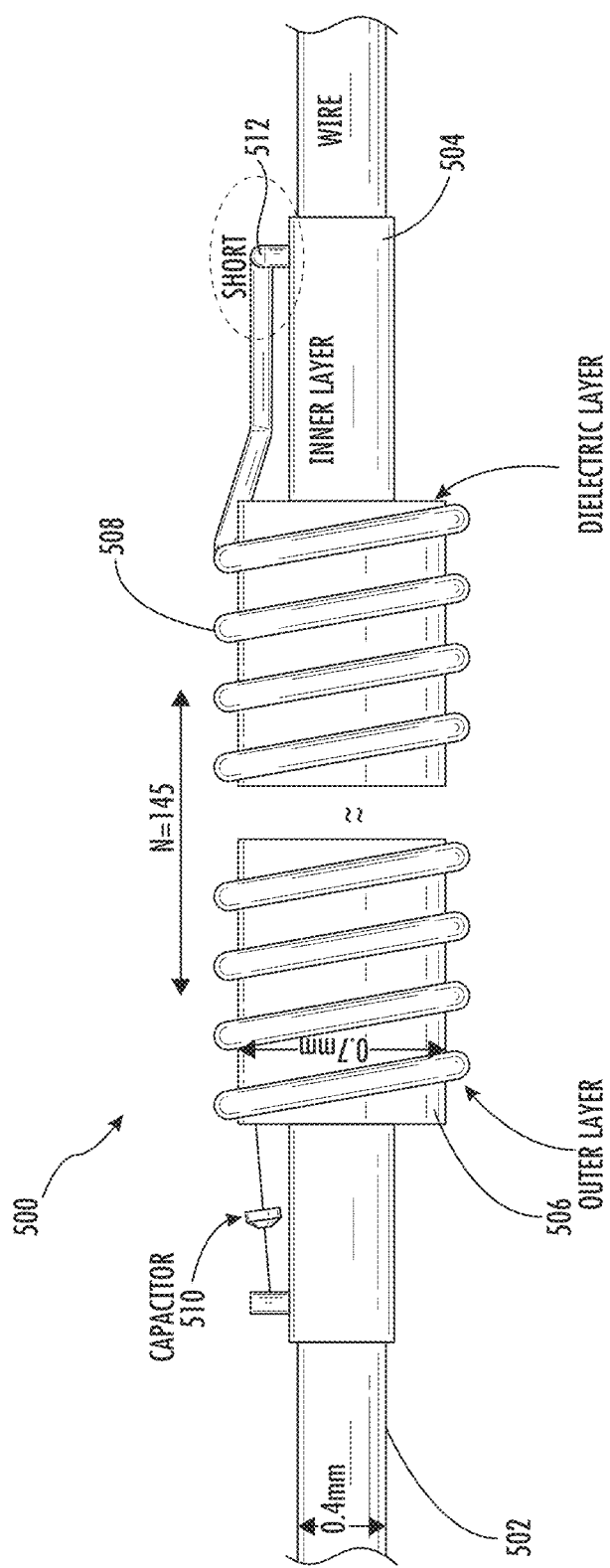
Figure 5F:
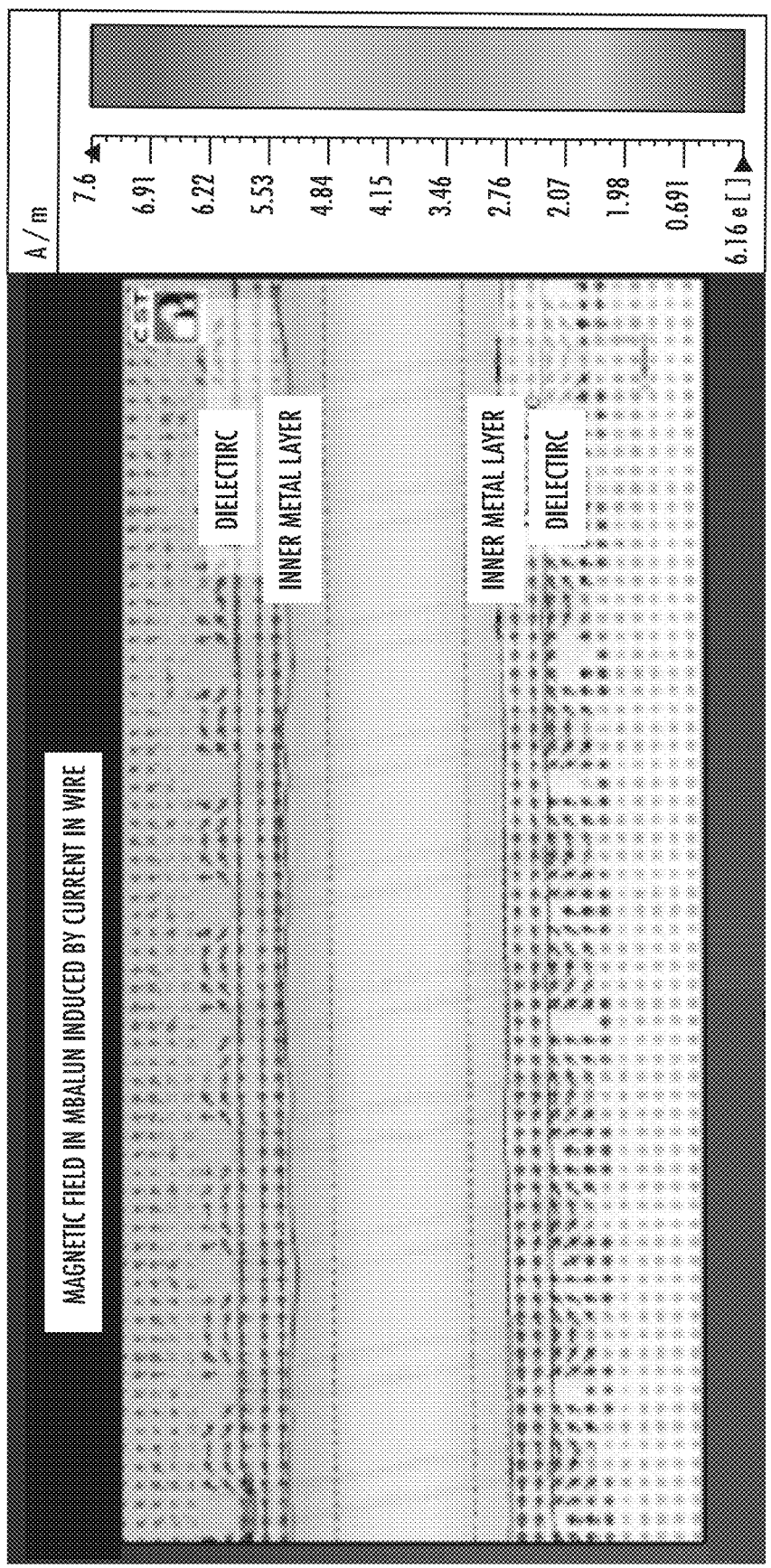
FIGS. 5F and 5G illustrate simulated magnetic and electrical fields produced in a specific MBalun design intended for placement on a metallic guidewire, which is placed around a current-carrying wire, as is illustrated in FIG. 5E.
Figure 5G:
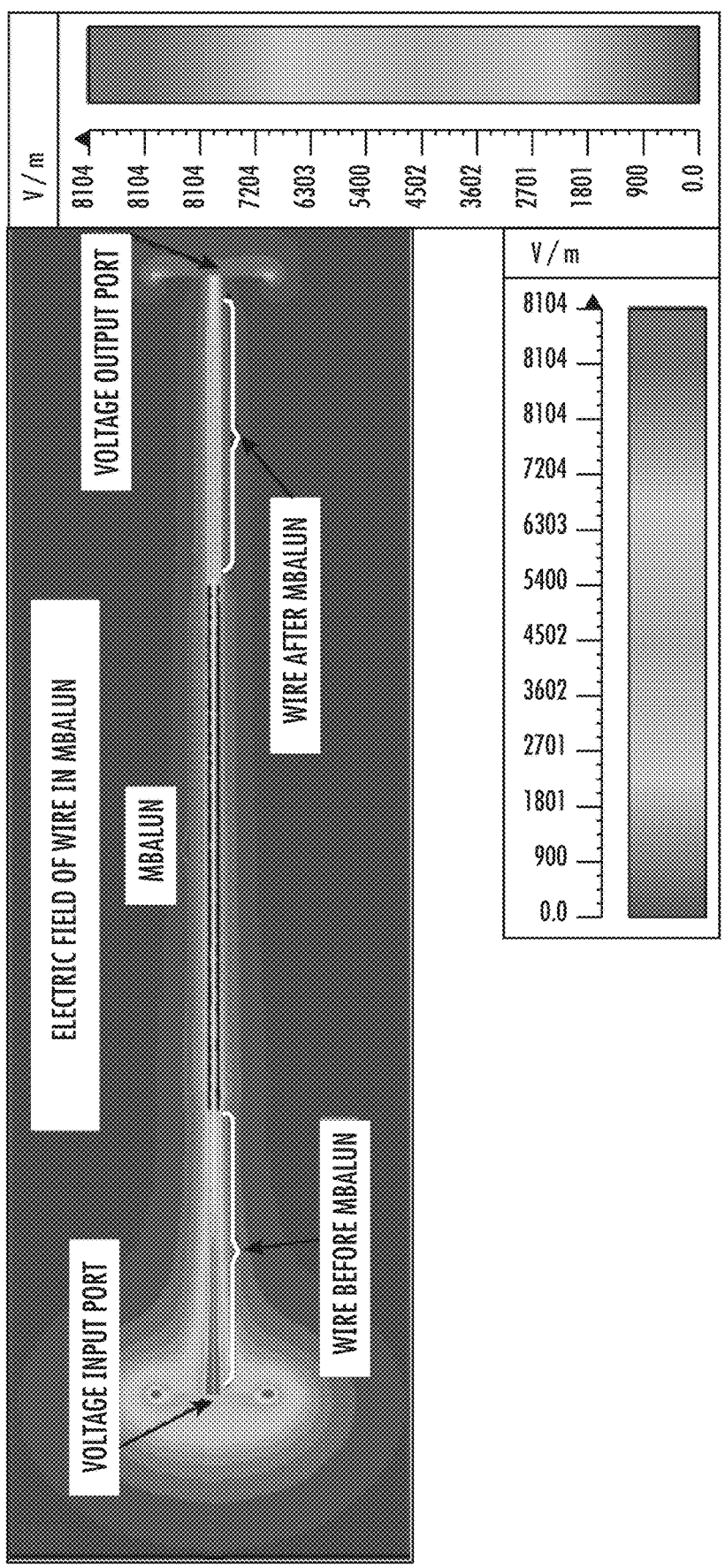

FIGS. 5A-5E illustrate side and partially sectional views of a device for MRI radiofrequency amelioration, according to an embodiment of the present MBalun invention. FIG. 5A illustrates a side view of the device 400 with regions A, B, and C. FIG. 5B illustrates region A in further detail, FIG. 5C illustrates region B in further detail, and FIG. 5D illustrates region C in further detail. FIG. 5B shows a tuning capacitor 402. The partially sectional view of FIGS. 5C and 5D show a coaxial cable shield 404 and a coaxial cable conductor 406. FIG. 5E illustrates electromagnetic simulation of performance of a specific implementation (MBalun1). The MBalun1 500 has inside it a 0.4 mm diameter current-carrying wire 502 whose electrical field is to be attenuated by the MBalun1. The wire is placed within MBalun1 that has a thin inner conducting tubular layer 504 and an outer layer 506. The outer layer 506 is further wrapped with a leaky solenoidal coil 508. The inner layer 504 is preferably formed from a metal and the outer layer 506 is preferably formed from a dielectric or an insulator. Any other materials known to or conceivable to one of skill in the art could also be used. Preferably, there are 145 wrappings of the coil 508 surrounding the outer 506. A tuning capacitor 510 is positioned on one side of the outer layer 506 and a short 512 is positioned on another side of the outer layer 506. FIG. 5F illustrates the magnetic field generated by the current carrying wire 502 inside the MBalun. A strong magnetic field is generated by the wire in the region 506, which is then coupled to the MBalun's solenoidal coil 508, and thus dissipated. FIG. 5G shows the strong electrical fields generated by the current-carrying wire 502 to the left of the MBalun, close to the Voltage Input Port. When the current flows through the MBalun, the magnetic field generated by the MBalun attenuates the electric field, so that its magnitude to the right of the MBalun, close to the Voltage Output port) is far smaller (~17.5 dB lower).

Figure 6:
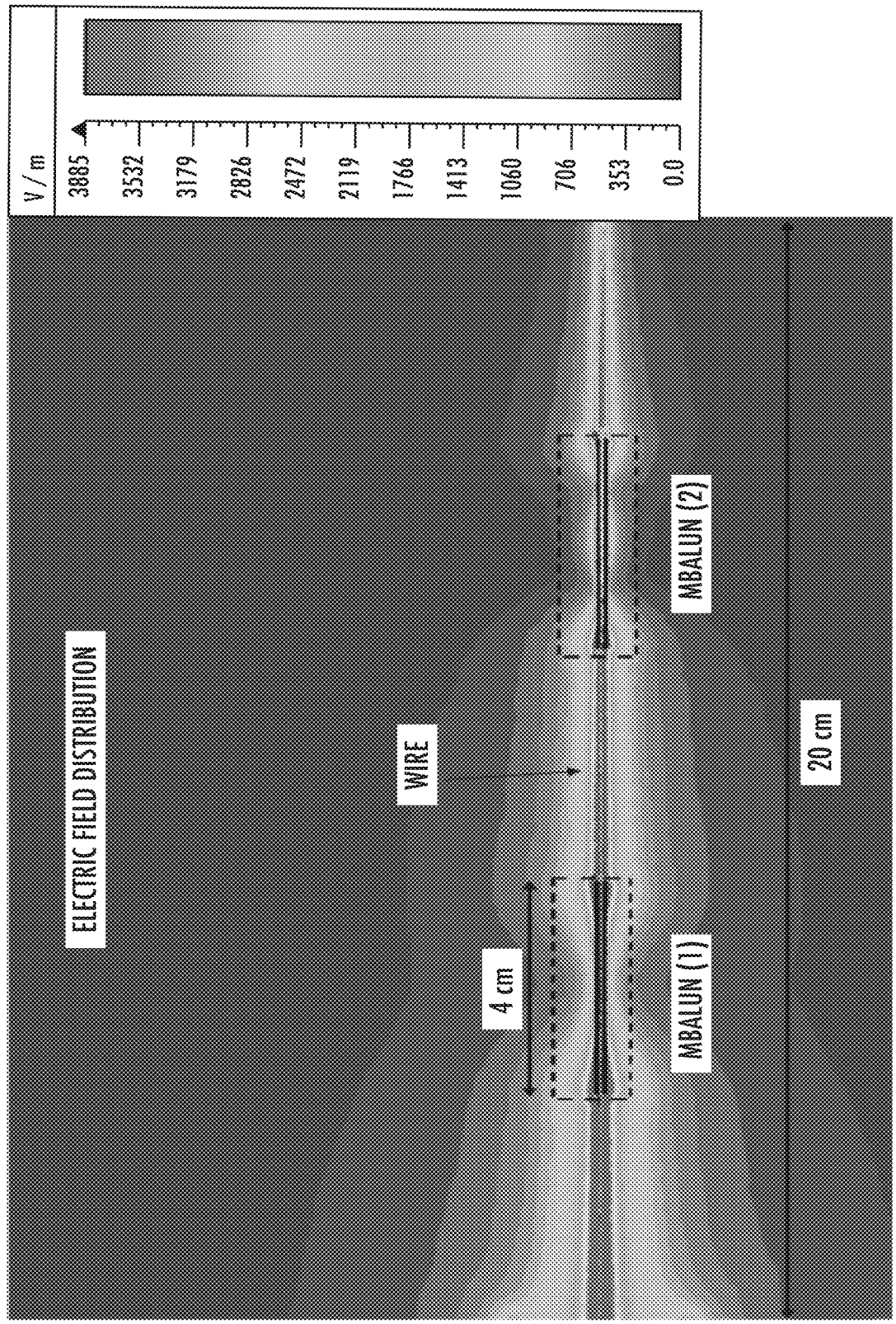
FIG. 6 illustrates simulated magnetic and electrical fields produced by two successive MBaluns of a design intended for placement on a metallic guidewire, which is placed around a current-carrying wire.

FIG. 6 shows a similar situation to that represented in FIGS. 5G, but here the current carrying wire goes through two successive MBaluns placed on a 20 cm stretch of a guidewire shaft. As shown in FIG. 6 each MBalun reduces the electric field present in the wire, illustrating the additive value of multiple MBaluns in reducing the electric field in the wire 402.

Figure 7A:
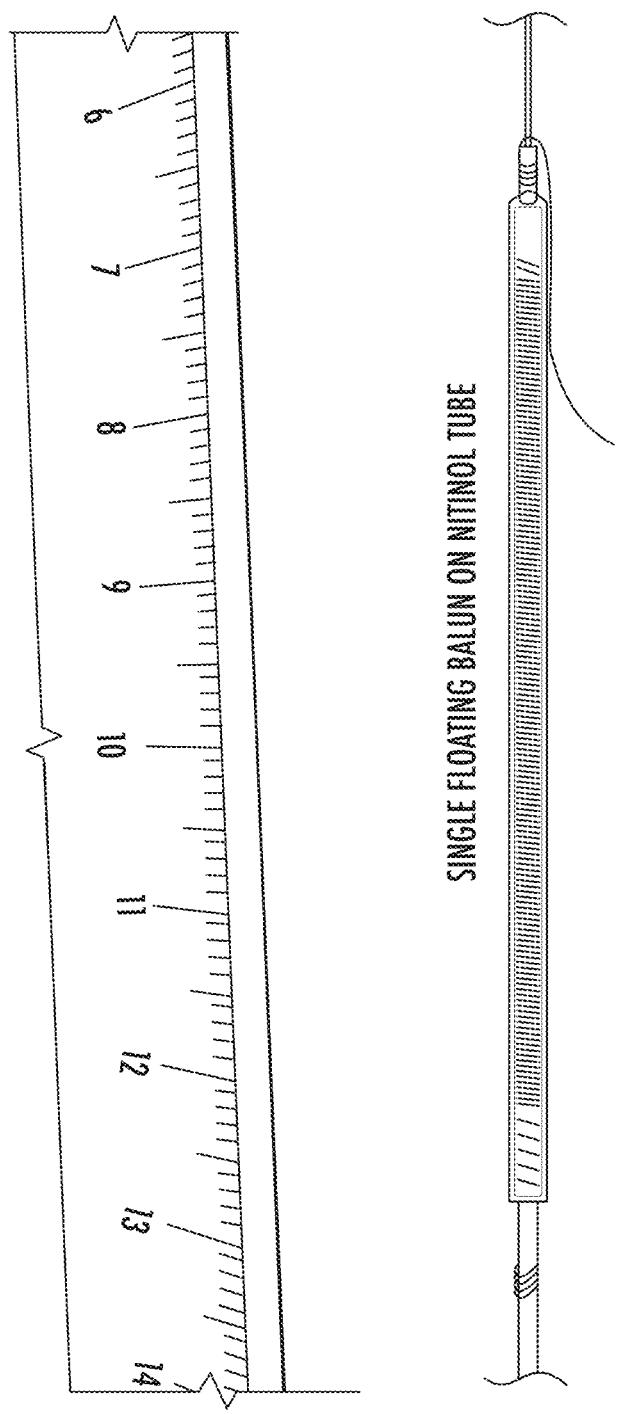
FIG. 7A illustrates a perspective view of single MBalun positioned on a Nitinol tube, according to an embodiment of the present invention.
Figure 7B:
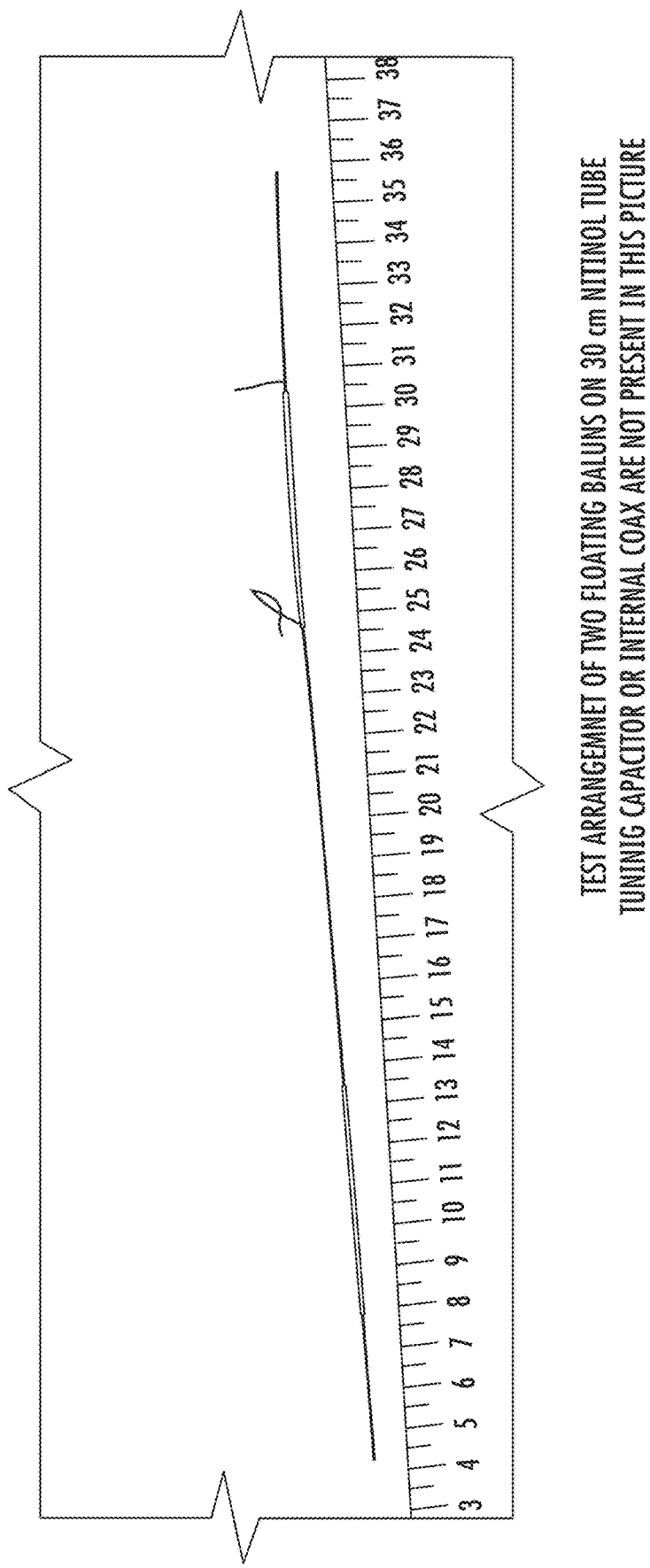
FIG. 7B illustrates a top down view of a test arrangement of two MBaluns on a 30 cm Nitinol tube.

FIG. 7A illustrates a single MBalun positioned on a Nitinol tube, according to an embodiment of the present invention. FIG. 7B illustrates a test arrangement of two MBaluns on a 20 cm Nitinol tube. FIG. 7B does not illustrate a tuning capacitor or internal coaxial cable conductor, however, these components are considered as included in the present invention. The Nitinol tube illustrated in FIGS. 7A and 7B, is included as an exemplary embodiment, that is not meant to be considered limiting. The Nitinol tube has an inner diameter of 0.254 mm, an outer diameter of 0.496 mm and a length of 29-30 cm. As illustrated in FIG. 7B, for testing, two floating baluns, each with a length of 50 mm, with a 100 mm gap between them, are disposed along the length of the Nitinol tube. The outer diameter of the tube including the balun and dielectric is ~1.1 mm. The coaxial cable conductor is configured to extend 10 cm out of each end of the Nitinol tube. Each MBalun is formed from 38 gage wire, with a 0.1 mm outer diameter, wound on PTFE tubing. There is a 0.3 mm gap between adjacent windings. The 50 mm length of each MBalun includes approximately 160 windings. The distance between the Nitinol tube and the wire is approximately the 0.2 mm thickness of the PTFE. A 10-13 pF parallel cap is required for tuning to 63.8 MHz (with slightly different values possible due to construction imperfections in the MBalun). The inductance L is approximately 625 nH.

Figure 7C:
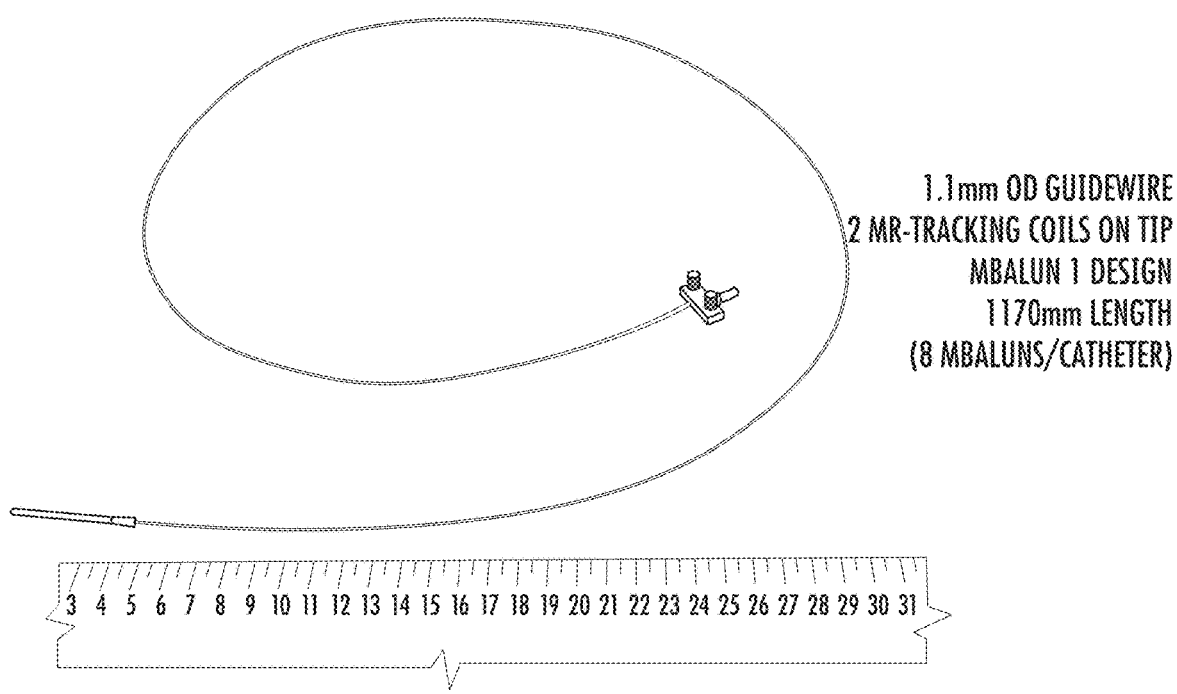
FIGS. 7C-7F illustrates perspective and side views of an active metallic guidewire, constructed with eight MBaluns along its shaft, according to an embodiment of the present invention, in which the MBalun1 design was used.
Figure 7D:
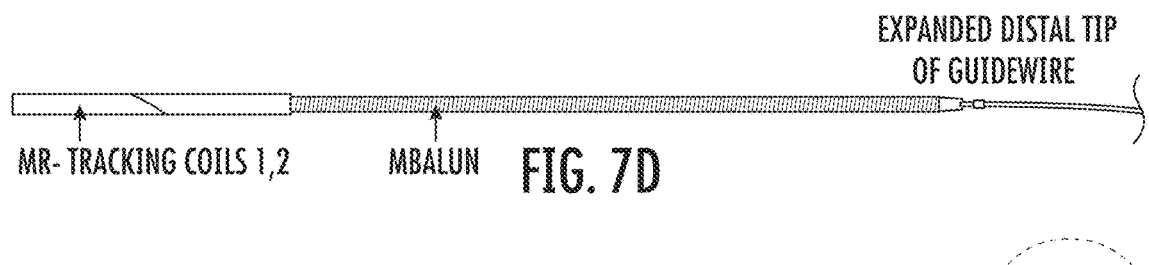
Figure 7E:
Figure 7F:
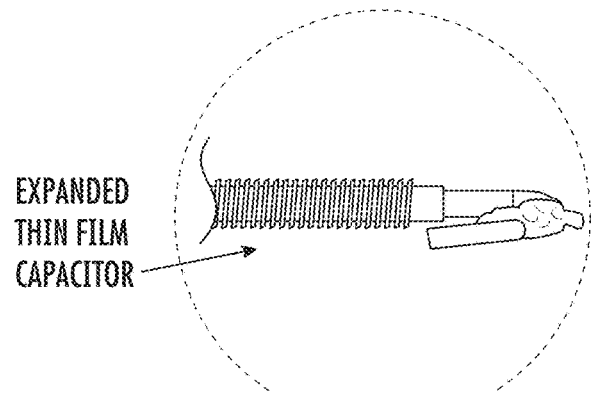

FIG. 7C illustrates eight MBaluns (grey arrows) positioned on a Nitinol tube, according to an embodiment of the present invention, in which an MRI-compatible active metallic guidewire was constructed. The guidewire is referred to as an active guidewire due to the presence of MRI-Tracking coils at the distal end of the guidewire, so that the location and orientation of the tip can be followed in real-time used an MR-Tracking pulse sequence (which is prior art). FIGS. 7D-7F show an expanded view of the distal portion of the active guidewire, which includes the most distal MBalun, as well as the two MR-Tracking coils.

FIGS. 7E and 7F also shows a expanded view of an MBalun which was designed according to embodiment MBalun1.

Figure 7G:
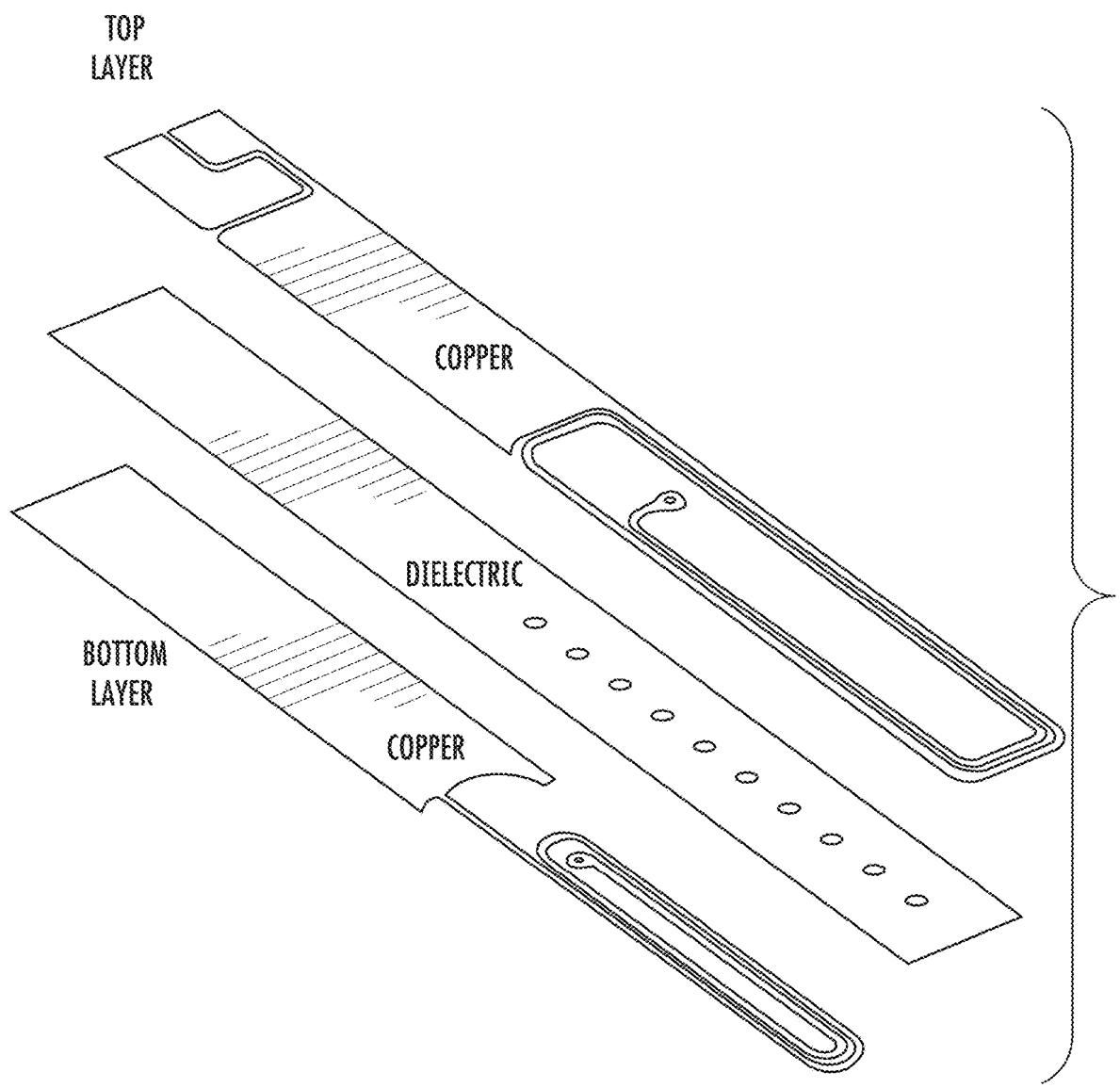
FIG. 7G illustrates an exploded view of an MR-Tracking micro-coil consisting of multiple layers of flexible circuit boards. MR-Tracking is a (prior-art) MR projection-based method for localizing in the MRI frame of reference the location of a point on the shaft of a catheter.

FIG. 7G illustrates an exploded view of a printed circuit from which a tuned and matched MR-Tracking coil for use at 63.8 MHz was constructed, which is also shown in the distal part of the guidewire shown in the lower part of FIG. 7C. The tuning and matching capacitors employed in the MR-Tracking coil employ embedded capacitors, i.e. they are constructed of dielectric thin films, which allows the entire MR-Tracking coil to have a thickness of ~0.2 mm, which is required in order to maintain the smaller outer diameter of the guidewire (FIG. 7C). FIG. 7H illustrates two MR-Tracking micro-coils, whose design is shown in FIG. 7G, wrapped on the distal end of the active metallic guidewire's (FIG. 7C) shaft.

Figure 9:
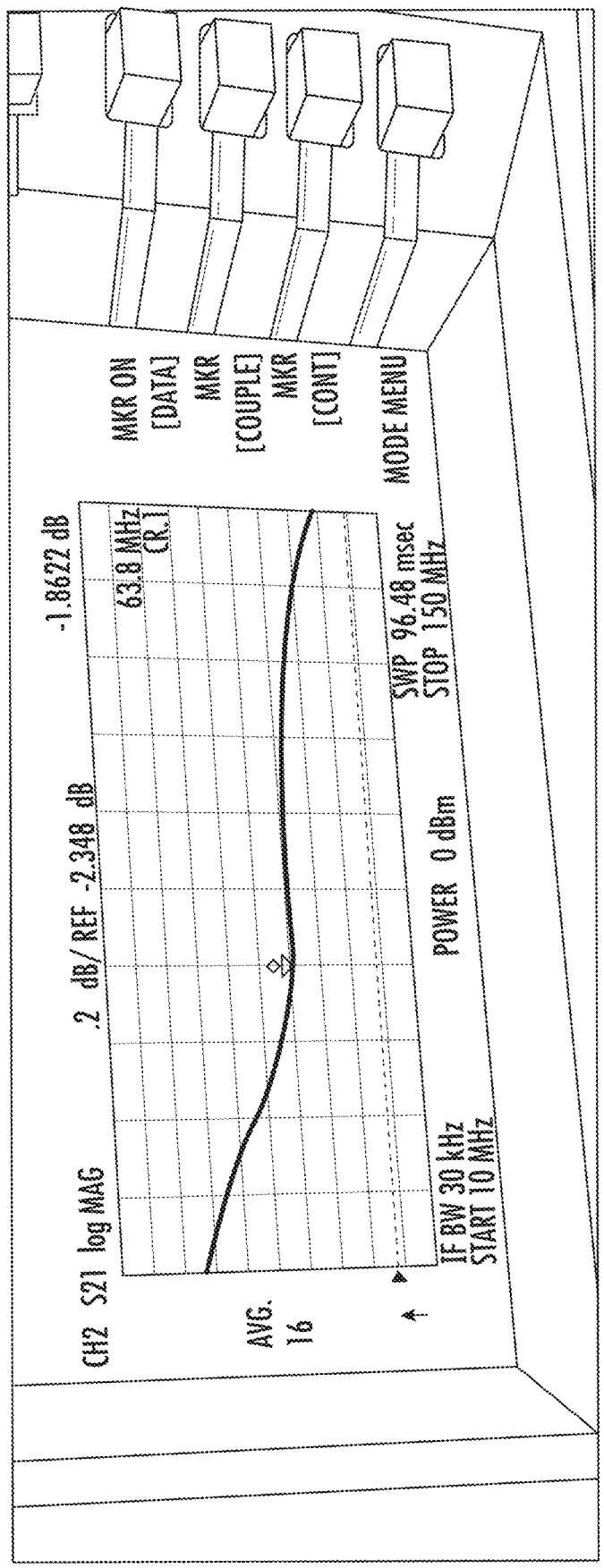
FIG. 9 illustrates the results of the experiment shown in FIG. 8, as shown on the screen of the network analyzer.

In FIG. 8, a 20 cm length segment of the active guidewire device shown in FIG. 7C, which consists of a nitinol tube with two mounted floating MBaluns, was tested in the laboratory to validate its functionality. A control device having no MBaluns was also tested. A 46 gauge coaxial cable was inserted through the nitinol tube, in order to study transmission through the tube. The three parameters tested were; (a) Ability of the 2-MBalun mounted guidewire segment to conduct differential mode signal without substantial attenuation, relative to the control device. (b) Ability of the 2-MBalun mounted guidewire segment to substantially attenuate common- mode signal propagating on the coaxial cable through the segment, relative to the control device. (c) Ability of the 2-MBalun mounted guidewire segment to substantially attenuate common- mode signal propagating on the surface of the tube as it passes through the MBalun, relative to the control device. FIG. 9 illustrates the results of the differential mode experiment.

A 5 cm length of coaxial cable was extended on each side outside of the guidewire tube, in order to induce differential mode voltage, or for inducing common mode (CM) voltage, which then flows in the coaxial cable that runs within the segment of the guidewire shaft. To test differential mode on either the test (with mounted MBaluns) or control tubes (without mounted MBaluns), one end of the coaxial cable conductor was connected to Port 1 of a Network Analyzer. The second end of the coaxial cable conductor was connected to Port 2 of the NA, which thereby allows for measuring the voltage that is launched in Port 1, passes through the MBalun-mounted tube and reaches Port 2 (i.e. this transmission or an S12 network analyzer measurement). This setup of the test device with the MBaluns is illustrated in FIG. 8.

Figure 10:
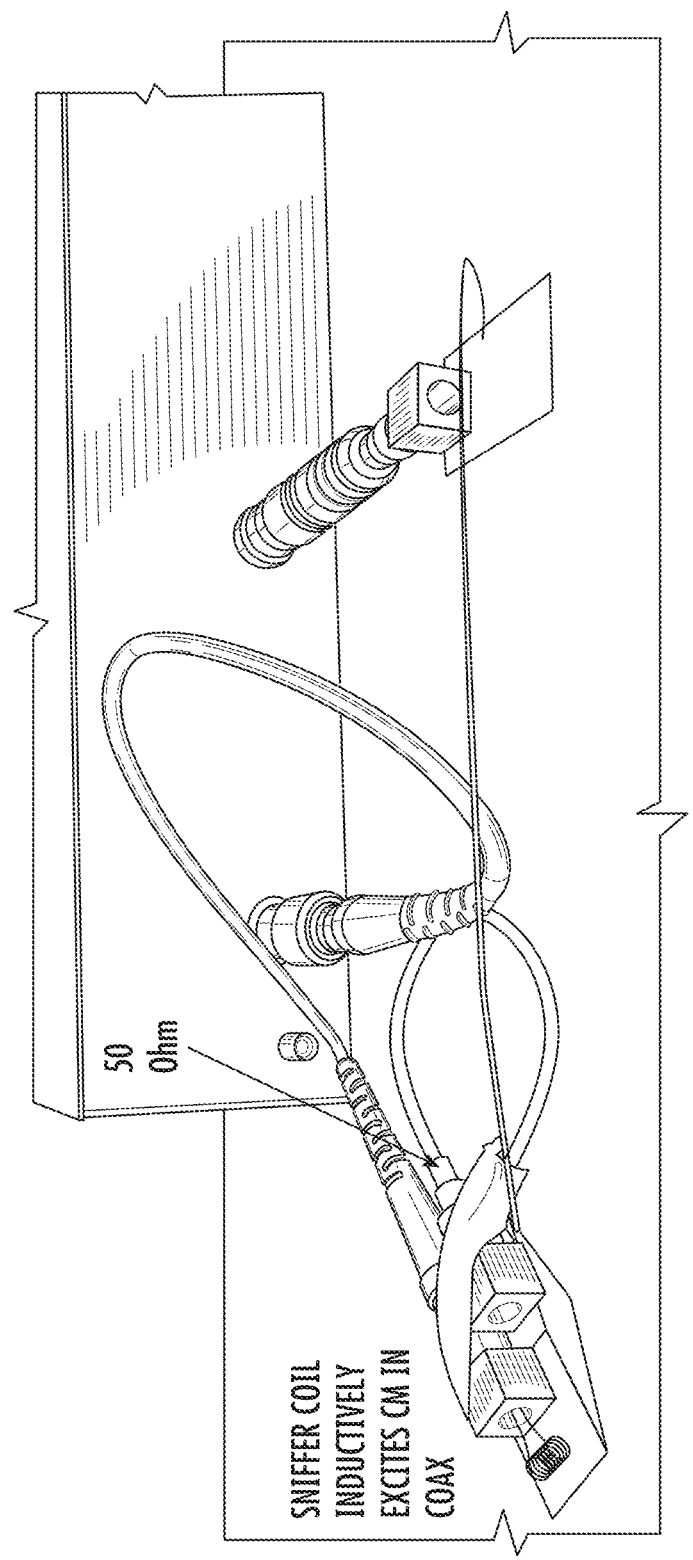
FIG. 10 illustrates an exemplary setup of the test device which employs a two-port vector network analyzer to test the transmission of common mode in a coaxial cable that runs through a metallic guidewire section overlaid with 2 MBaluns.
Figure 11:
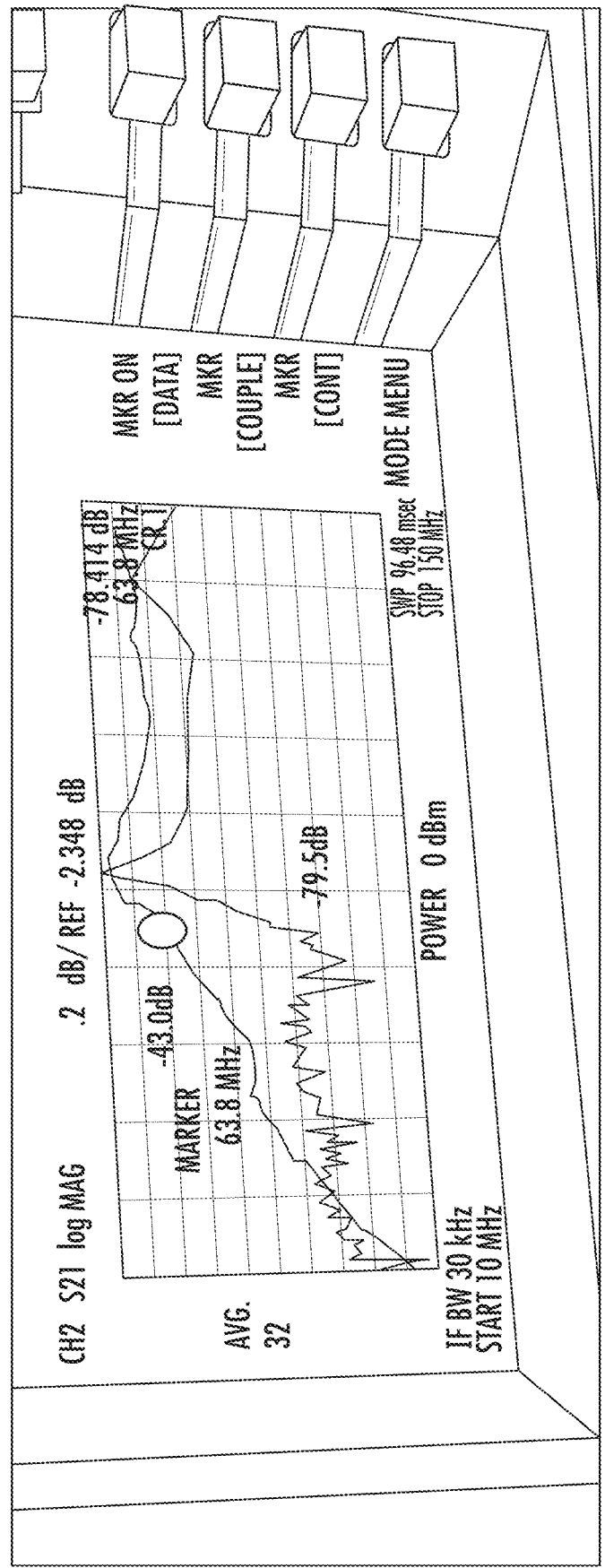
FIG. 11 illustrates the results of the experiment shown in FIG. 10 as shown on the screen of the network analyzer, relative to a control experiment utilizing the same setup, where the tested guidewire segment has no MBaluns mounted on its shaft.

To test common mode current transmission through the test and control tubes, one end of the coaxial cable conductor is connected to a 50 Ohm load (FIG. 10). A "sniffer" transmitter coil is connected to Port 1 of the Network Analyzer in order to induce current onto the exposed coaxial cabling. The other end of the coaxial cable connector is connected to Port 2 of the Network Analyzer. FIG. 10 illustrates the setup of the test device with the MBaluns. FIG. 11 illustrates the results of the experiment, as compared to the control experiment.

Figure 12:
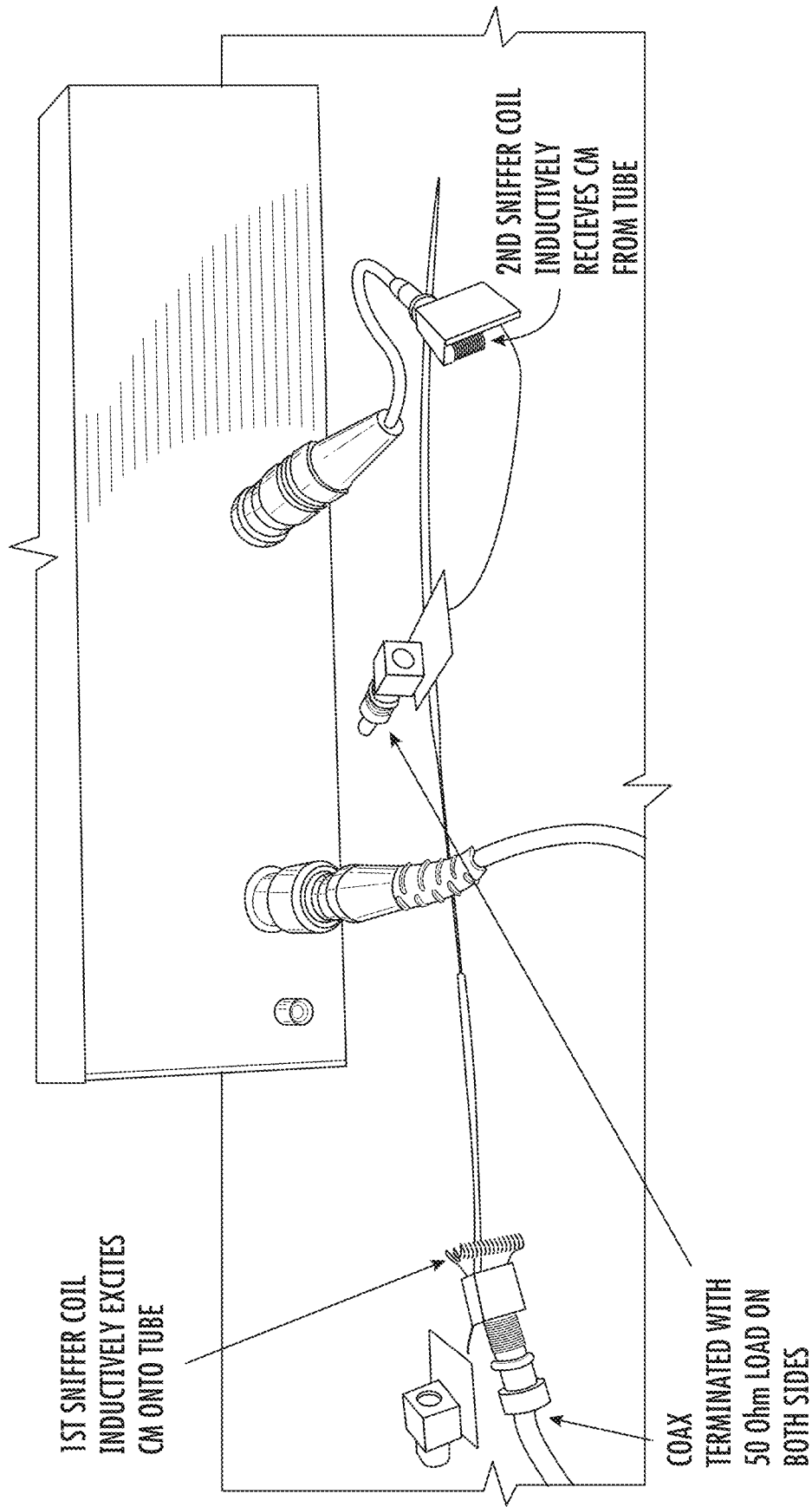
FIG. 12 illustrates an exemplary setup of the test device which employs a two-port vector network analyzer to test the transmission of common mode on the surface of a metallic guidewire section overlaid with 2 MBaluns.
Figure 13:
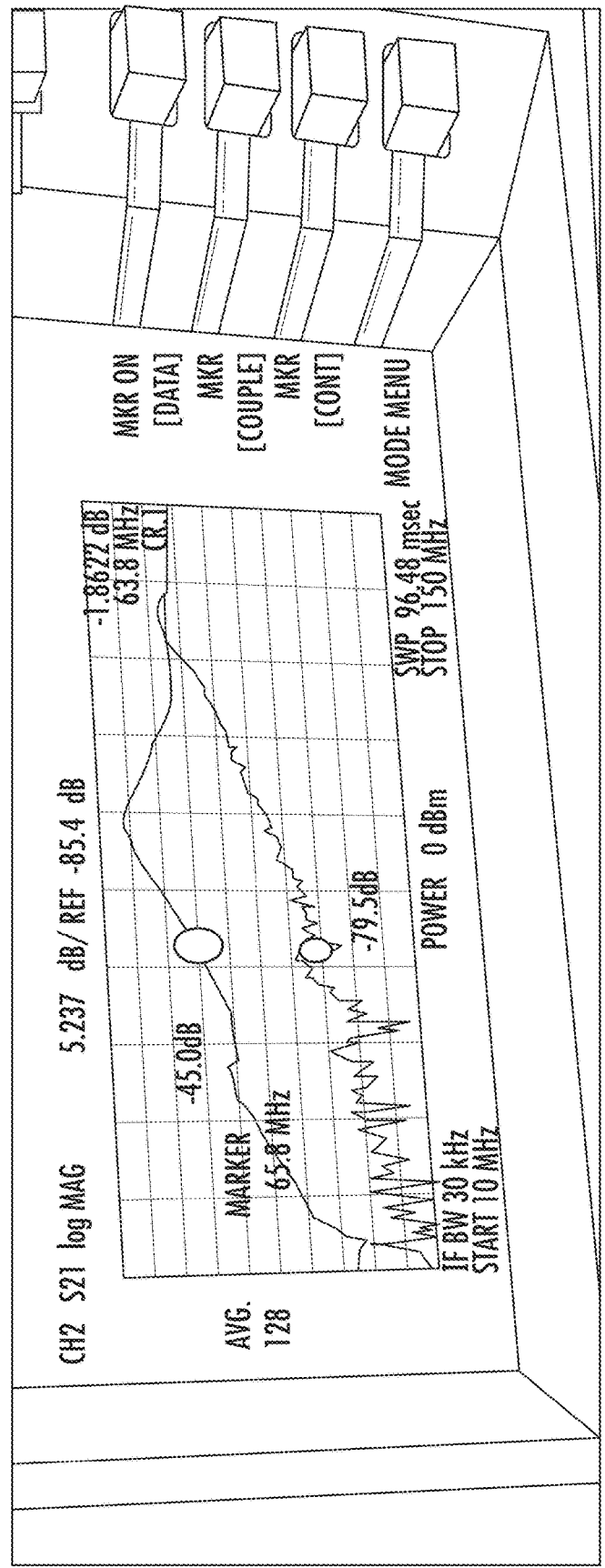
FIG. 13 illustrates the results of the experiment shown in FIG. 12 as shown on the screen of the network analyzer, relative to a control experiment utilizing the same setup, where the tested guidewire segment has no MBaluns mounted on its shaft.

Testing of common mode propagation on the MBalun-mounted metallic tube surface includes connecting the coaxial cable connector on both ends to 50 Ohm loads. A sniffer transmission coil is connected to Port 1 of the NA, in order to induce current onto the tube at one end and a second sniffer coil is connected to Port 2 of the Network Analyzer to pick up current from the surface of the tube at the second end, after the current passes the MBaluns. FIG. 12 illustrates the setup of the test device with the MBaluns. FIG. 13 illustrates the results of the experiment.

The results of the tests on the tube which is mounted with the two MBaluns, as compared to the results from the control device (FIG. 11) show that MBaluns placed on the shaft of the guidewire segment are effective at blocking common-mode propagation on the coaxial cables that pass through the tube. The tube-mounted MBaluns also reduce common-mode propagation on the tube surface, as seen in FIG. 13. By comparing the results on the control tube (the guidewire tube segment that has no MBaluns and has a coaxial cables passing within, it appears that (a) differential mode propagation in coax is not substantially (±0.2 dB) hampered by the MBaluns mounted on the tube, (b) common mode transmission through the control tube is ~30 dB larger at 63.8 MHz than that seen in the tube mounted with two MBaluns, from which it can be deduced that each MBalun of this particular design provides ~15 dB of common-mode attenuation.

FIGS. 14A-14C illustrate an active Electrophysiology catheter that was constructed using an embodiment MBalun 2 of the invention. There are nine MBaluns (red arrows) on the catheter. The lower part of FIG. 14A shows an expanded view of the distal portion of the catheter, which includes four MR-Tracking coils as well as an MBalun. The FIGS. 14B and 14C also shows an expanded view of the MBalun (MBalun2 design) alone.

Figure 14D:
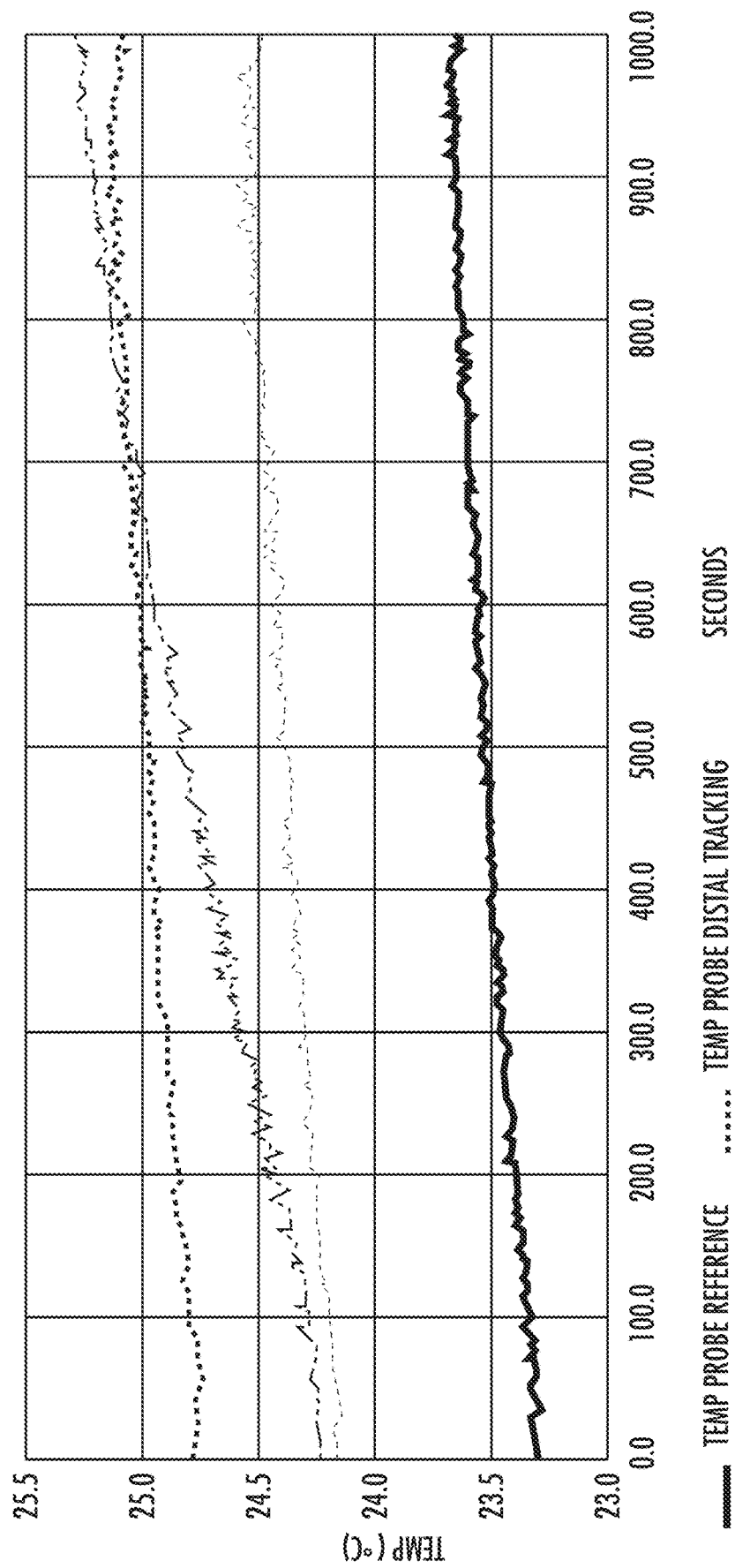
FIG. 14D illustrates a graphical view of temperature over time for a MBalun2 enabled EP catheter placed in an ASTM gel phantom (ASTM Standard F2182-11a. Standard Test Method for Measurement of Radio Frequency Induced Heating On or Near Passive Implants During Magnetic Resonance Imaging. ASTM International 2011) during continuous MR imaging for 15 minutes with a 3.99 Watt/kg Specific Absorption Rate (SAR) MR sequence in an ASTM standard gel phantom, as measured with MR-compatible fiberoptic probes placed at various locations on the catheter.

FIG. 14D illustrates a graphical view of temperature over time for the EP catheter of FIG. 14A, placed in an ASTM gel phantom (ASTM F2182 test method) during a continuous imaging sequence that induced 3.99 Watt/kg, where 4 Watt/kg is the maximal SAR allowed for human chest imaging, into the phantom for a period of 15 minutes. It is clearly seen that the tip of the catheter, which is expected to increase most in temperature, only heats up by 1.5 Celsius degrees which is within ASTM/FDA/IEC guidelines for interventional devices operating within an MRI scanner.

Figure 15A:
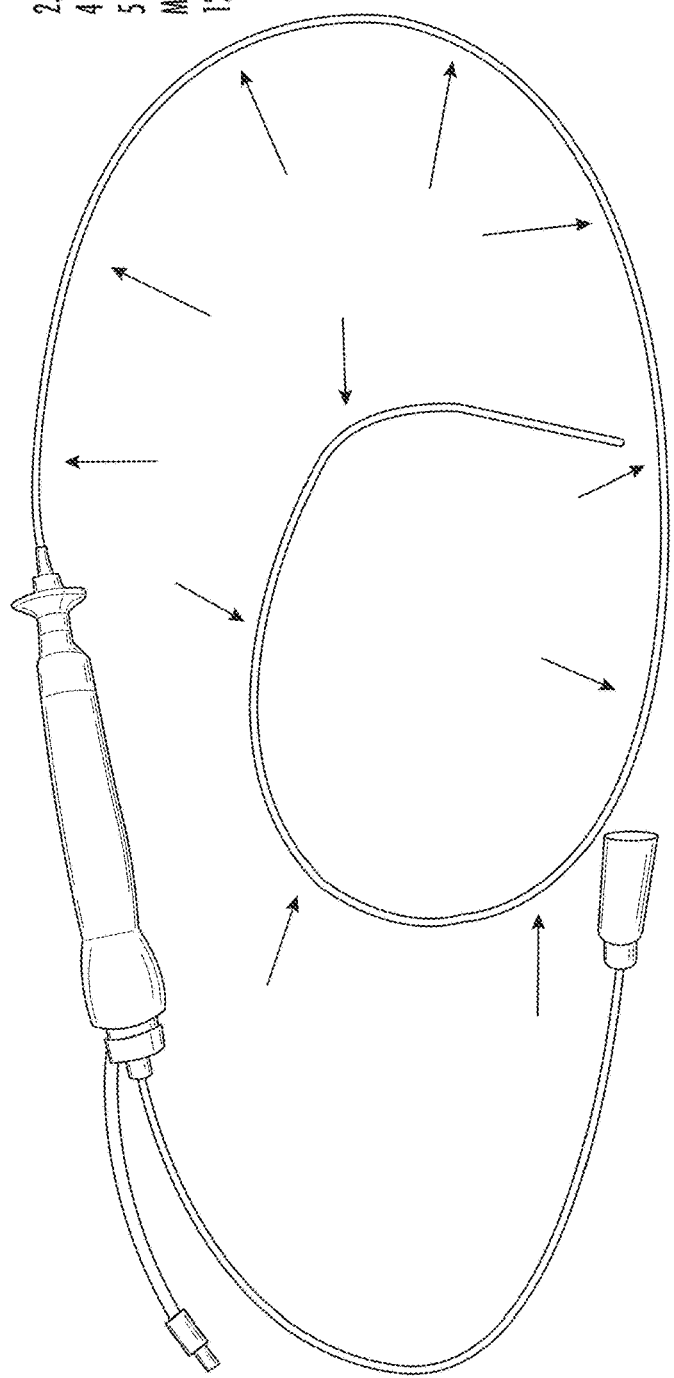
FIGS. 15A and 15B illustrate perspective views of an EP deflectable catheter that has impedance, MR-Tracking and temperature probes on its shaft, with heat amelioration provided by 11 MBaluns.
Figure 15B:
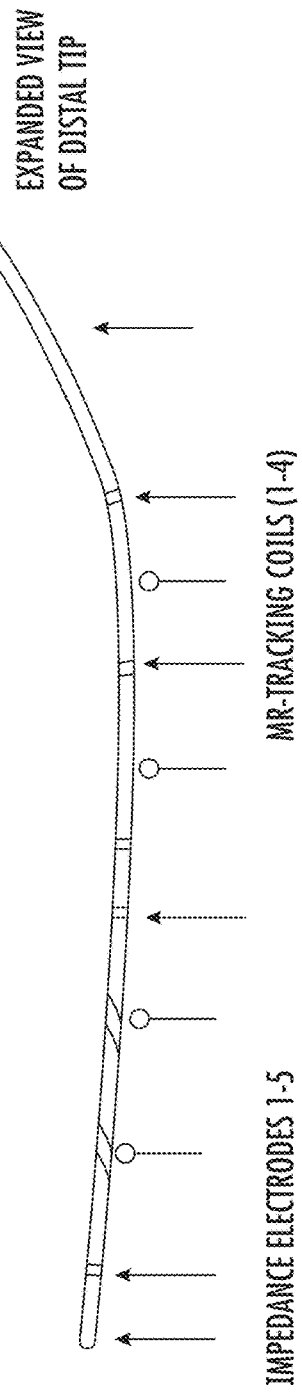

FIGS. 15A and 15B illustrate a deflectable metallic braided Electrophysiology catheter that was constructed using an embodiment MBalun 2 of the invention. This catheter has impedance, temperature and MR-Tracking sensors on its shaft. There are eleven MBaluns (red arrows) on the catheter. The lower part of FIG. 15 shows an expanded view of the distal portion of the catheter, which includes four MR-Tracking coils (Yellow arrows), five impedance electrodes (Green arrows), as well as an MBalun. In this catheter, the MBaluns remove RF induced currents that propagate on the MR-Tracking lines, as well as those on the thermocouple and impedance lines, thereby removing the need to place individual heat amelioration solutions for each of the ten cables that transmit signal up the shaft, which would take a lot of room inside the catheter.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A catheter compatible with magnetic resonance imaging (MRI) comprising:
   a metallic backbone wherein the metallic backbone comprises a metallic braided catheter; and
   a miniature floating resonant radiofrequency trap (MBalun), wherein the MBalun comprises an inner conductor surrounding the metallic backbone, a dielectric layer, a coil wrapping surrounding the dielectric layer, and a short.

2. The catheter of claim 1 wherein:
   the inner conductor comprises an electrically conducting tube or braided cable;
   the dielectric layer further comprises an insulating dielectric layer configured to overlay the inner conductor of the MBalun;
   the MBalun comprises a leaky solenoid comprises a large (>1) pitch solenoid comprising multiple conductive wire windings configured to overlay the insulating dielectric layer, wherein the solenoid forms an outer conductor of the MBalun;
   the MBalun comprises a tuning capacitor;
   wherein the solenoid is connected to one side of the tuning capacitor at an end of the solenoid;
   wherein the tuning capacitor is then connected at its second end to the inner conductor, and
   wherein the tuning capacitor is used to resonate the MBalun to a desired resonance frequency.

3. The catheter of claim 2 further comprising the metallic backbone and the MBalun having a pattern length of one quarter of a wavelength.

4. The catheter of claim 2 further comprising a segment of metallic backbone being alternated with a segment of MBalun.

5. The catheter of claim 2 further comprising the MBalun being placed around an outside surface of the metallic backbone at predetermined intervals.

6. The catheter of claim 5 further comprising a copper shield disposed within an inner lumen of the metallic backbone.

7. The catheter of claim 2 wherein a conductive continuity of the metallic backbone is broken in order to create the short.

8. The catheter of claim 7 further comprising the short being directed to the copper shield.

9. The catheter of claim 2 wherein the MBalun is formed from copper.

10. The catheter of claim 1 wherein the MBalun is configured to remove electromagnetic currents that have been induced on the metallic backbone from Radio-Frequency (RF) transmitters within the MRI scanner.

11. The catheter of claim 1 wherein the MBalun is configured to remove electromagnetic currents that have been induced on wires that are within the metallic backbone, wherein the wires within the metallic backbone can take the form of one selected from a group consisting of single wires, coaxial cables, and twisted pair cables from RF transmitters within the MRI scanner.

12. The catheter of claim 1 wherein the MBalun is configured to remove electromagnetic currents that have been induced on wires that are within the metallic backbone wherein the wires within the metallic backbone can take the form of one selected from a group consisting of single wires, coaxial cables, and twisted pair cables from Radio-Frequency transmitters within the MRI scanner.

13. A device compatible with magnetic resonance imaging (MRI) comprising:
   a conductive metallic backbone wherein the conductive metallic backbone comprises a single filament; and
   a miniature floating resonant radiofrequency trap (MBalun) disposed along a length of the conductive metallic backbone, wherein the MBalun comprises an inner conductor surrounding the metallic backbone, a dielectric layer, a leaky solenoid surrounding the dielectric layer, a short, and a tuning capacitor, wherein the tuning capacitor is configured to resonate with an inductance of the MBalun at a required frequency such that the tuning capacitor removes predetermined signals.

14. The device of claim 13 further comprising the conductive metallic backbone and the MBalun having a pattern length of one quarter of a wavelength.

15. The device of claim 13 further comprising a segment of the conductive metallic backbone being alternated with a segment of MBalun.

16. The device of claim 13 further comprising the MBalun being placed around an outside surface of the conductive metallic backbone at predetermined intervals.

17. The device of claim 13 wherein conductive continuity of the conductive metallic backbone is broken in order to create a short.

18. The device of claim 17 further comprising the short being directed to the inner conductor.

19. The device of claim 13 wherein the MBalun is formed from copper.

20. The device of claim 13 wherein the MBalun is configured to remove electromagnetic currents that have been induced on the conductive metallic backbone from Radio-Frequency transmitters within the MRI scanner.

* * * * *